United States Patent
Miyabe

(10) Patent No.: US 10,177,840 B2
(45) Date of Patent: Jan. 8, 2019

(54) COMMUNICATION APPARATUS, METHOD OF COMMUNICATION AND COMMUNICATION SYSTEM

(71) Applicant: FUJITSU LIMITED, Kawasaki-shi, Kanagawa (JP)

(72) Inventor: Masatake Miyabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/966,199

(22) Filed: Apr. 30, 2018

(65) Prior Publication Data

US 2018/0323867 A1 Nov. 8, 2018

(30) Foreign Application Priority Data

May 8, 2017 (JP) ................................. 2017-092620

(51) Int. Cl.
*H04J 14/02* (2006.01)
*H04Q 11/00* (2006.01)
*H04B 10/075* (2013.01)

(52) U.S. Cl.
CPC ....... *H04B 10/075* (2013.01); *H04Q 11/0062* (2013.01); *H04J 14/021* (2013.01); *H04J 14/022* (2013.01); *H04J 14/0216* (2013.01); *H04Q 2011/0083* (2013.01)

(58) Field of Classification Search
CPC ............. H04B 10/075; H04Q 11/0062; H04Q 2011/0083; H04J 14/021; H04J 14/0216; H04J 14/022
USPC .......................................................... 398/20
See application file for complete search history.

(56) References Cited

U.S. PATENT DOCUMENTS

| | | | |
|---|---|---|---|
| 2002/0030864 A1* | 3/2002 | Chaudhuri | H04J 14/0227 398/5 |
| 2005/0105905 A1* | 5/2005 | Ovadia | H04L 45/62 398/47 |
| 2006/0291485 A1* | 12/2006 | Thubert | H04L 45/02 370/401 |
| 2012/0195319 A1* | 8/2012 | Bragg | H04L 45/04 370/401 |

FOREIGN PATENT DOCUMENTS

| | | |
|---|---|---|
| JP | 2001-285349 | 10/2001 |
| JP | 2014-027471 | 2/2014 |

* cited by examiner

*Primary Examiner* — Dalzid E Singh
(74) *Attorney, Agent, or Firm* — Fujitsu Patent Center

(57) ABSTRACT

A communication apparatus configured to communicate with a router included in a first network and a multiplexer that multiplexes a plurality of optical signals having different wavelengths transmitted from the communication apparatus, the communication apparatus comprising a memory, and a processor coupled to the memory and configured to transmit and receive a first signal to and from the router, transmit and receive a second signal to and from another communication apparatus in a second network through the multiplexer, the second signal having a transmission scheme different from the first signal, mutually convert the first signal and the second signal with each other, detect a first communication disabled state between the another communication apparatus and the communication apparatus, and transmit, to the router, a first detection signal for detecting adjacency relationship between the communication apparatus and the router when the first communication disabled state is detected.

20 Claims, 24 Drawing Sheets

COMMUNICATION APPARATUS, METHOD OF COMMUNICATION AND COMMUNICATION SYSTEM

CROSS-REFERENCE TO RELATED APPLICATION

This application is based upon and claims the benefit of priority of the prior Japanese Patent Application No. 2017-92620, filed on May 8, 2017, the entire contents of which are incorporated herein by reference.

FIELD

The embodiments discussed herein are related to a communication apparatus, a method of communication and a communication system.

BACKGROUND

To respond to increasing communication demands, for example, a communication service enabling large capacity data transmission between routers by coupling the routers via the wavelength division multiplexing (WDM) network is used widely. The WDM network includes a reconfigurable optical add and drop multiplexer (ROADM) that wavelength multiplexes and transmits a plurality of optical signals having different wavelengths and a transponder that transmits and receives an optical signal for each wavelength to and from the ROADM.

The transponder is, for example, coupled with a router in the client network. Upon detecting non-setting or fault of the optical line (or optical path) between ROADMs, the transponder terminates the link with the router by a function of the link pass through. This allows the router to detect non-setting or fault of the optical line and thus promptly change the path of packets in accordance with a dynamic routing protocol such as, for example, an Open Shortest Path First (OSPF).

When providing a communication service (such as wide area Ethernet service) of Ethernet (registered trademark: the same applies hereinafter) between routers, the adjacency relationship between the transponder and the router has to be properly recognized prior to setting of the optical line to identify the coupling target by the optical line. Related techniques are disclosed in, for example, Japanese Laid-open Patent Publication No. 2014-27471.

SUMMARY

According to an aspect of the invention, a communication apparatus configured to communicate with a router included in a first network and a multiplexer that multiplexes a plurality of optical signals having different wavelengths transmitted from the communication apparatus, the communication apparatus comprising a memory, and a processor coupled to the memory and configured to transmit and receive a first signal to and from the router, transmit and receive a second signal to and from another communication apparatus in a second network through the multiplexer, the second signal having a transmission scheme different from the first signal, mutually convert the first signal and the second signal with each other, detect a first communication disabled state between the another communication apparatus and the communication apparatus, and transmit, to the router, a first detection signal for detecting adjacency relationship between the communication apparatus and the router when the first communication disabled state is detected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A link between a transponder and a router is decoupled by a link pass through function when an optical line is not set. Thus, information such as link state advertisement (LSA) on the adjacency relationship between apparatuses may not be exchanged, for example, by a hello packet. For this reason, when opening a communication service, the adjacency relationship between the transponder and the router is verified, for example, by coupling an optical fiber or metal cable, which couples the transponder and the router with each other, to a dedicated test device.

Such manual verification may not only cause an adjacency relationship recognition error but also take a time. Thus, it may cause a delay of the opening time of the communication service. For example, when using a technique of the software defined network (SDN) for control of the WDM network, the application programmable interface (API) promptly sets an optical line in accordance with the request for the communication service, or dynamically sets addition and deletion of the optical line. Thus, it is difficult to perform verification for every setting of the optical line or for every change of the setting.

While the communication service is provided, verification of the adjacency relationship (coupling normality) between the transponder and the router is performed by a communication which conforms to a verification protocol for the coupling normality such as the bidirectional forwarding detection (BFD) between routers via the optical line. However, when the optical line is not set or in fault, communication between routers is not available and therefore verification of the adjacency relationship between the transponder and the router is difficult.

Figure 1:
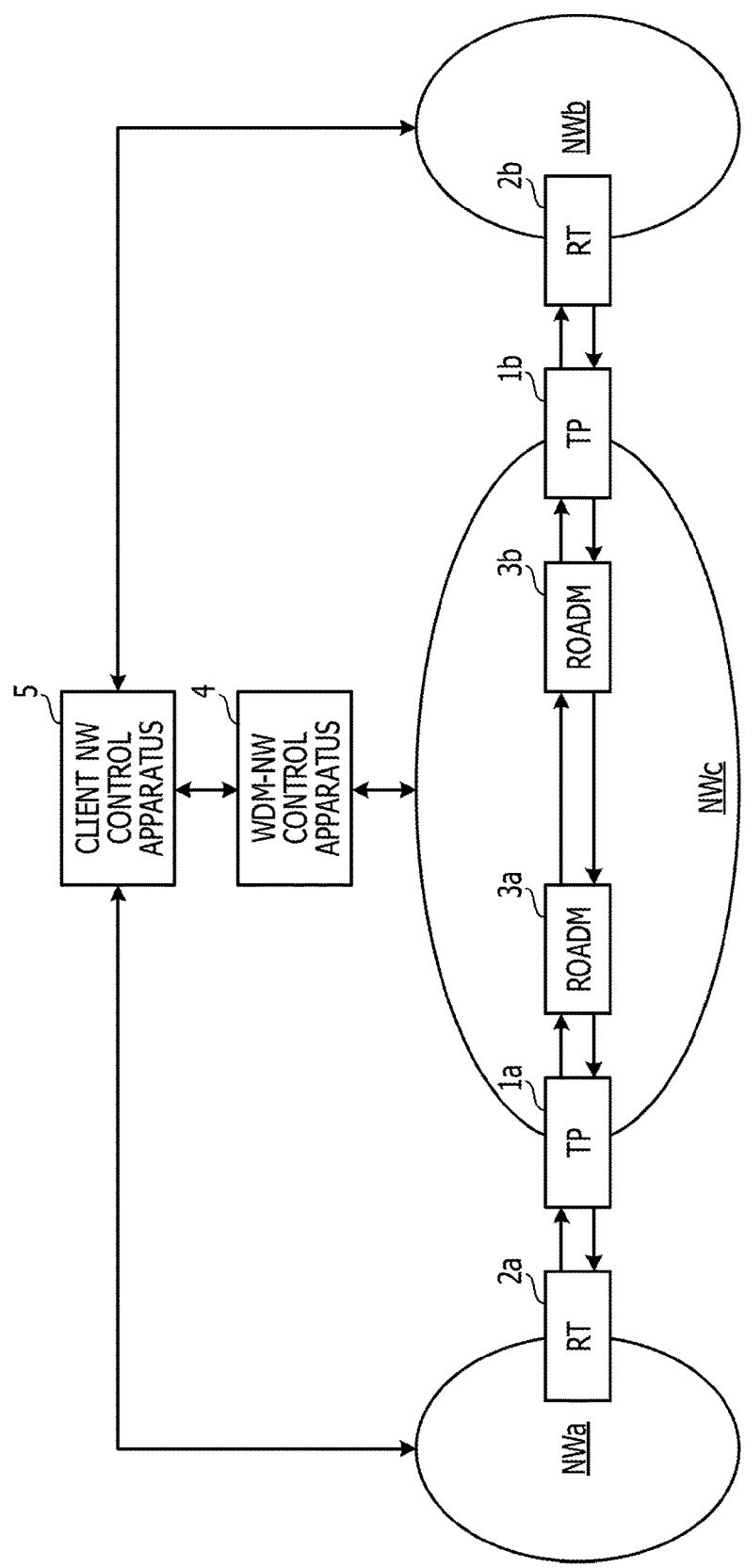
FIG. 1 is a configuration diagram illustrating an example of a communication system.

FIG. 1 is a configuration diagram illustrating an example of a communication system. The communication system includes transponders (TP) 1a, 1b which are an example of the communication apparatus, routers (RT) 2a, 2b in client networks NWa and NWb, ROADMs 3a, 3b which are a wavelength multiplexing transmission apparatus, a WDM network (WDM-NW) control apparatus 4, and a client network (NW) control apparatus 5. The transponders 1a, 1b and the ROADMs 3a, 3b are installed in the WDM network NWc.

Client networks NWa, NWb are an example of a first network, and are, for example, local area networks (LAN). The WDM network NWc is an example of a second network, and allows a communication between the transponders 1a, 1b via an optical line (or an optical path) for every wavelength set between the ROADMs 3a, 3b.

The router 2a is coupled with the transponder 1a via an optical fiber, and the router 2b is coupled with the transponder 1b via an optical fiber. The router 2a and the transponder 1a, and the router 2b and the transponder 1b may be coupled with each other by using a metal cable.

The routers 2a, 2b transfer an Internet protocol (IP) packet of one of client networks NWa, NWb to another one of client networks NWa, NWb via an optical line in the WDM network NWc. In other words, an IP packet of client networks NWa, NWb in a layer different from that of the WDM network NWc is transmitted via the WDM network NWc. This enables large capacity data transmission between client networks NWa, NWb.

The transponder 1a and the ROADM 3a, and the transponder 1b and the ROADM 3b are coupled with each other by using a pair of optical fibers. The ROADMs 3a, 3b are coupled with each other by using a pair of optical fibers.

The transponders 1a, 1b are configured to transmit and receive an optical signal of a predetermined wavelength to the ROADMs 3a, 3b. More specifically, the transponders 1a, 1b are configured to receive an optical signal dropped by the ROADMs 3a, 3b and transmit an Ethernet signal mapped into the optical signal to the routers 2a, 2b.

Also, the transponders 1a, 1b are configured to receive an Ethernet signal from the routers 2a, 2b and transmit an optical signal into which the Ethernet signal is mapped to the ROADMs 3a, 3b. In other words, the transponders 1a, 1b are configured to add the optical signal to the ROADMs 3a, 3b. In this embodiment, both of the routers 2a, 2b and the transponders 1a, 1b transmit and receive the optical Ethernet signal to and from each other. However, it is not limited thereto, and both of the routers 2a, 2b and the transponders 1a, 1b may transmit and receive an electrical Ethernet signal to and from each other.

The ROADMs 3a, 3b are coupled with each other via the optical fiber which is a transmission path. The ROADMs 3a, 3b are configured to wavelength-multiplex a plurality of optical signals having different wavelengths, for example, with a wavelength selection switch to generate wavelength multiplexing optical signals, and transmit wavelength multiplexing optical signals via the optical fiber respectively. Both of the ROADMs 3a, 3b transmit and receive, to and from each other, a wavelength multiplexing optical signal including optical signals of the transponders 1a, 1b via an optical line set by the WDM network control apparatus 4.

This causes the transponders 1a, 1b to transmit and receive the optical signal to and from corresponding devices, other transponders 1b, 1a via the WDM network NWc.

The WDM network control apparatus 4 is coupled with the transponders 1a, 1b and the ROADMs 3a, 3b in the WDM network NWc. The WDM network control apparatus 4 is an example of the monitoring control apparatus and is configured to monitor and control the WDM network NWc.

The WDM network control apparatus 4 is configured to set the optical line to the ROADMs 3a, 3b. The optical line is set by specifying the path and the wavelength of the optical line. For this reason, when setting and operating the optical line, the WDM network control apparatus 4 recognizes the transponders 1a, 1b adjacent to the routers 2a, 2b as a starting point node and an end point node.

The client network control apparatus 5 monitors and controls client networks NWa, NWb. The client network control apparatus 5, for example, manages the configuration of the routers 2a, 2b, and monitors and controls client networks NWa, NWb in cooperation with the WDM network control apparatus 4.

Figure 2:
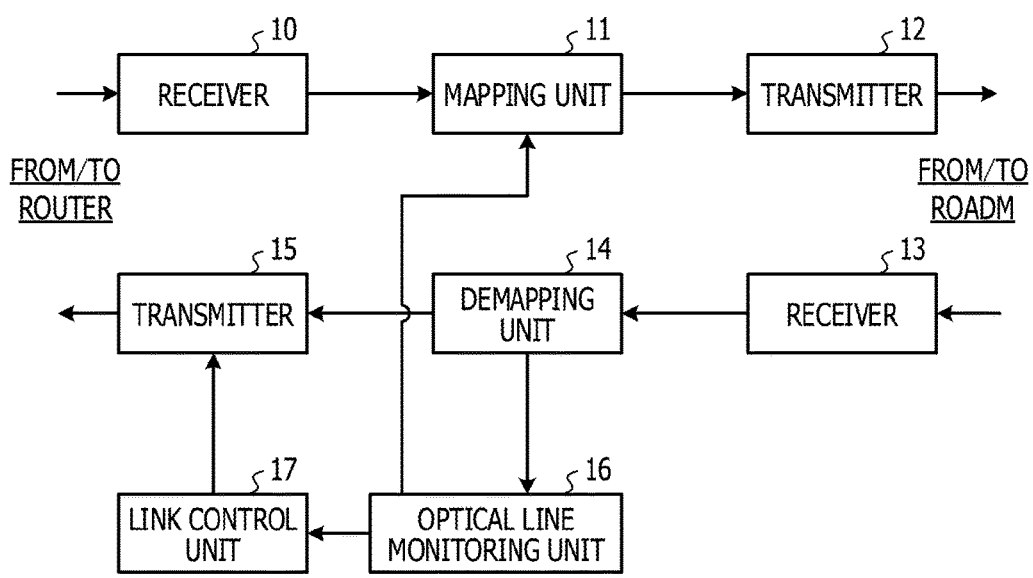
FIG. 2 is a configuration diagram illustrating a transponder according to a comparative example.

FIG. 2 is a configuration diagram the illustrating transponders 1a, 1b according to a comparative example. The transponders 1a, 1b include receivers 10, 13, transmitters 12, 15, a mapping unit 11, a demapping unit 14, an optical line monitoring unit 16, and a link control unit 17.

The transmitter 15 and the receiver 10 are an example of a first transmission and reception unit and a first transmission and reception circuit, and are configured to transmit and receive an Ethernet signal to and from client networks NWa, NWb. The transmitter 12 and the receiver 13 are an example of a second transmission and reception unit and a second transmission and reception circuit, and are configured to transmit and receive an optical signal in a scheme different from the Ethernet signal to and from corresponding devices, the transponders 1a, 1b via the WDM network NWc. The transmitters 12, 15 include, for example, laser diodes, and the receivers 10, 13 include, for example, photodiodes. The Ethernet signal is an example of the data signal.

The receiver 10 is configured to receive the Ethernet signal from the routers 2a, 2b and output to the mapping unit 11. The mapping unit 11 is configured to map the Ethernet signal into a symbol corresponding to the modulation scheme of the transmitter 12 and output symbol data thereof to the transmitter 12. The transmitter 15 is configured to electrooptically convert the symbol data to generate an optical signal and transmit to the ROADMs 3a, 3b. This causes the transponders 1a, 1b to transmit the optical signal to corresponding devices, transponders 1b, 1a.

The receiver 13 is configured to receive the optical signal from the ROADMs 3a, 3b and generate an electric signal by electrooptical conversion. The receiver 13 is configured to output the electric signal to the demapping unit 14. The demapping unit 14 is configured to demap the symbol data included in the electric signal to generate the Ethernet signal and output the Ethernet signal to the transmitter 15. The transmitter 15 is configured to transmit the Ethernet signal to the routers 2a, 2b.

Thus, the mapping unit 11 and the demapping unit 14 are an example of a conversion unit and a conversion circuit, and are configured to convert the Ethernet signal and the optical signal from and to each other. In other words, the mapping unit 11 is configured to convert the Ethernet signal into the scheme of the optical signal such that the Ethernet signal flowing in client networks NWa, NWb flows in the WDM network NWc.

The demapping unit 14 is configured to convert the optical signal into the scheme of the Ethernet signal by demapping such that the optical signal flowing in the WDM network NWc flows in client networks NWa, NWb. The mapping unit 11 and the demapping unit 14 are constituted by a logical circuit including, for example, the field programmable gate array (FPGA) and the application specific integrated circuit (ASIC).

The optical line monitoring unit 16 is configured to monitor the state of the optical line based on a notification from the demapping unit 14. The optical line monitoring unit 16 is configured to, as an example of the detection unit and the detection circuit, detect the communication disabled state with corresponding devices, transponders 1a, 1b. The optical line monitoring unit 16 is configured to instruct the mapping unit 11 to generate a fault notification when a fault (for example, decoupling of the optical fiber) occurs in the optical line in a direction receiving the optical signal from corresponding devices, transponders 1a, 1b. The mapping unit 11 is configured to insert the fault notification into an overhead of the optical signal and output the optical signal to the transmitter 12.

Thus, when a fault occurs in the optical line in a direction of transmitting the optical signal to corresponding devices, transponders 1a, 1b, the demapping unit 14 may detect the fault notification from the overhead of the optical signal received from transponders 1a, 1b. The demapping unit 14 is configured to output the fault notification to the optical line monitoring unit 16.

The optical line monitoring unit 16 is configured to instruct the link control unit 17 to decouple the link with the routers 2a, 2b in accordance with the function of the link pass through when a fault occurs in the optical line. Also, when the optical line is not set, the optical line monitoring unit 16 is configured to detect in the same manner as the fault and instruct the link control unit 17 to decouple the link with the routers 2a, 2b.

The link control unit 17 is configured to decouple the link with the routers 2a, 2b by stopping the optical output of the transmitter 15. The link control unit 17 is configured to stop the optical output of the transmitter 15 by, for example, off-control of the output of the laser diode. This causes transponders 1a, 1b to notify the fault of the optical line to the routers 2a, 2b. The link control unit 17 and the optical line monitoring unit 16 are formed, for example as functions of the software.

Figure 3:
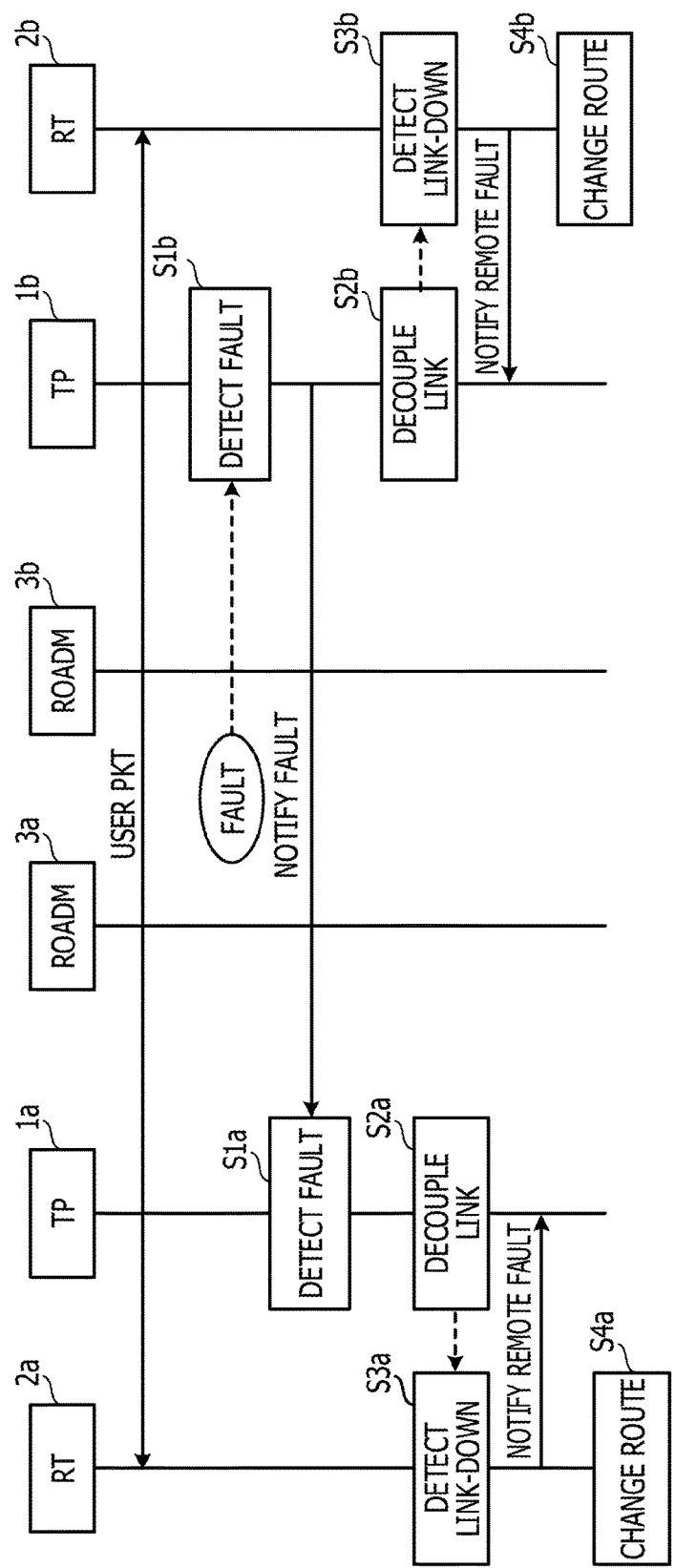
FIG. 3 is a sequence diagram illustrating operation of a communication system according to the comparative example.

FIG. 3 is a sequence diagram illustrating operation of a communication system according to the comparative example. When the optical line is set between the ROADMs 3a, 3b, the routers 2a, 2b transmit and receive the user packet (user PKT) to and from each other.

For example, when a fault occurs in the optical line in a direction transmitting the optical signal from the ROADM 3a to the ROADM 3b, the optical line monitoring unit 16 of the transponder 1b detects the fault from non-receipt of the optical signal or an error of the optical signal (reference numeral S1b). The transmitter 12 of the transponder 1b transmits the optical signal including the fault notification generated by the mapping unit 11 to the transponder 1a of the corresponding device. This causes the optical line monitoring unit 16 of the transponder 1a to detect the fault of the optical line (reference numeral S1a).

Upon detecting the fault, the optical line monitoring unit 16 of each of transponders 1a, 1b instructs the link control unit 17 to decouple the link from the routers 2a, 2b. The link control unit 17 decouples the link in accordance with the instruction (reference signs S2a, S2b).

Each of the routers 2a, 2b detects link-down when the link is decoupled (reference signs S3a, S3b). Next, upon detecting the link-down, each of the routers 2a, 2b outputs "Remote Fault" notification to transponders 1a, 1b. The "Remote Fault" notification is specified by the Institute of Electrical and Electronics Engineers, Inc. (IEEE) 802.3.

Next, each of the routers 2a, 2b determines that transfer paths passing through transponders 1a, 1b are not available due to the fault of the optical line, and changes the transfer path of the user packet in accordance with the OSPF (reference signs S4a, S4b). When the optical line is not set, each of the routers 2a, 2b also changes the transfer path upon decoupling the link in the same manner as the fault.

Thus, when the optical line is not available, transponders 1a, 1b notify to that effect to the routers 2a, 2b by decoupling the link. This enables the routers 2a, 2b to change the transfer path of the user packet promptly (for example, in 1 second or less) after the optical line becomes disabled.

However, when the link is in the down state, transponders 1a, 1b and the routers 2a, 2b are unable to exchange information on the adjacency relationship between devices such as the LSA by, for example, the hello packet.

For solving the problem, transponders 1a, 1b described in the embodiments below transmit a detection packet for detecting the adjacency relationship between the routers 2a, 2b when the optical line is not set or when a fault occurs. The detection packet includes the hello packet of the OSPF and the LLDP packet specified by the IEEE 802.1AB.

First Embodiment

Figure 4:
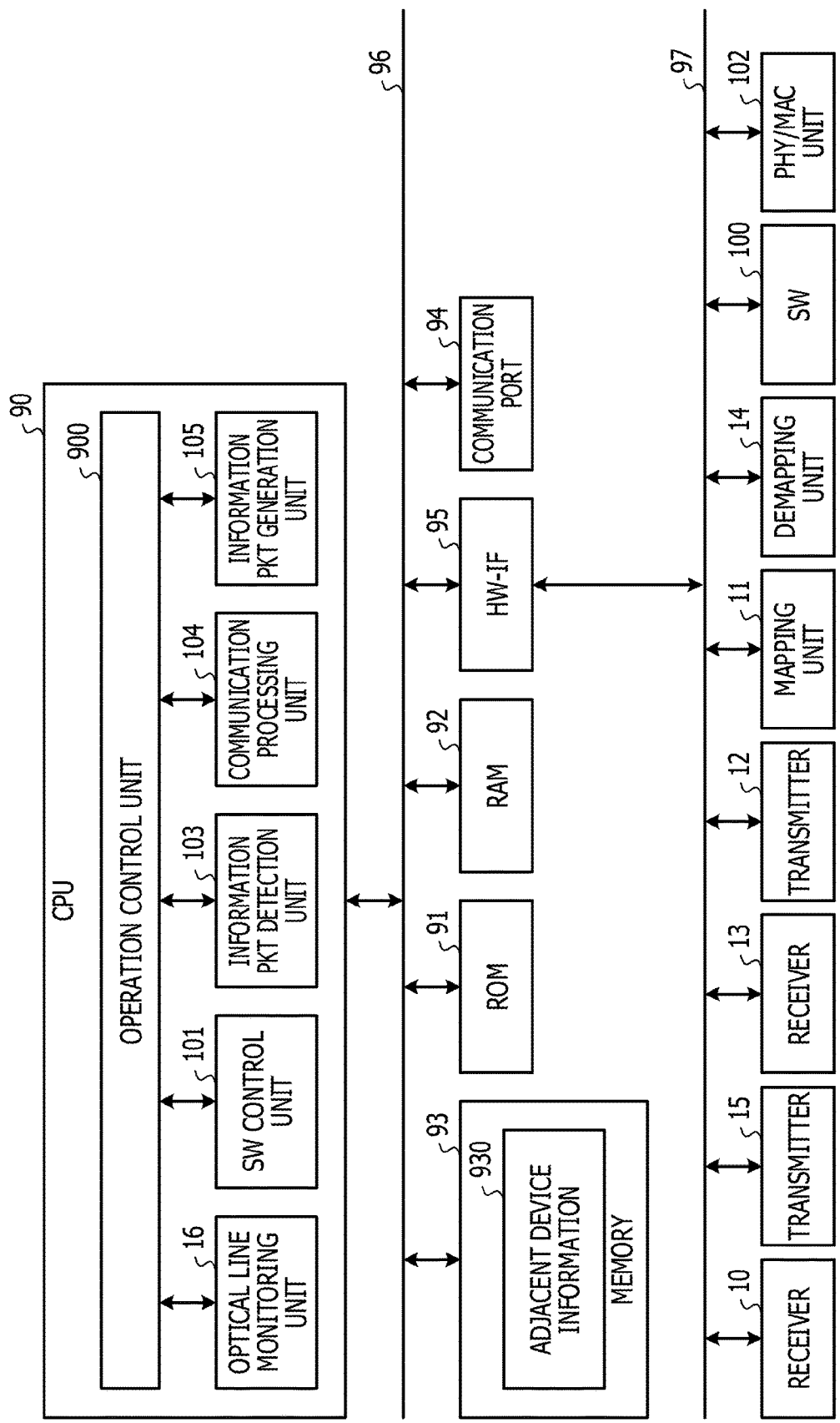
FIG. 4 is a configuration diagram illustrating a transponder according to a first embodiment.

FIG. 4 is a configuration diagram illustrating the transponders 1a, 1b according to a first embodiment. Each of transponders 1a, 1b includes a central processing unit (CPU)

90, a read only memory (ROM) 91, a random access memory (RAM) 92, a memory 93, a communication port 94, and a hardware interface unit (HW-IF) 95. The CPU 90 is coupled with the ROM 91, the RAM 92, the memory 93, the HW-IF 95, and the communication port 94 via a path 96 so as to allow mutual input and output of signals. Each of the transponders 1a, 1b may include another processor including the microprocessor instead of the CPU 90.

The ROM 91 stores a program which drives the CPU 90. The RAM 92 functions as a working memory of the CPU 90. The communication port 94 is, for example, a communication circuit of the LAN, and is configured to communicate with the WDM network control apparatus 4.

Upon reading the program from the ROM 91, the CPU 90 creates, as functions, an operation control unit 900, the optical line monitoring unit 16, a switch (SW) control unit 101, an information packet (PKT) detection unit 103, a communication processing unit 104, and an information packet (PKT) generation unit 105. The memory 93 stores adjacent device information 930. Functions created in the CPU 90 by the program may be constituted as logical circuits by the FPGA. This also applies to the embodiments described hereinafter.

The optical line monitoring unit 16, the switch control unit 101, the information packet detection unit 103, the communication processing unit 104, and the information packet generation unit 105 operate in accordance with the instruction of the operation control unit 900. The operation control unit 900, the optical line monitoring unit 16, the switch control unit 101, the information packet detection unit 103, the communication processing unit 104, the information packet generation unit 105, and the adjacent device information 930 are described later.

The transponders 1a, 1b include the receivers 10, 13, the transmitters 12, 15, the mapping unit 11, the demapping unit 14, a switch unit (SW) 100, and a physical layer (PHY)/media access control (MAC) unit 102. The receivers 10, 13, the transmitters 12, 15, the mapping unit 11, the demapping unit 14, the switch unit 100, the PHY/MAC unit 102 are coupled with the HW-IF 95 via a bus 97.

The HW-IF 95 controls the bus 97 and thereby processes access from the CPU 90 to the receivers 10, 13, the transmitters 12, 15, the mapping unit 11, the demapping unit 14, the switch unit 100, and the PHY/MAC unit 102. The receivers 10, 13, the transmitters 12, 15, the mapping unit 11, the demapping unit 14, the switch unit 100, and the PHY/MAC unit 102 are described later.

The operation control unit 900 causes the optical line monitoring unit 16, the switch control unit 101, the information packet detection unit 103, the communication processing unit 104, and the information packet generation unit 105 to operate in cooperation with the receivers 10, 13, the transmitters 12, 15, the mapping unit 11, the demapping unit 14, the switch unit 100, and the PHY/MAC unit 102 via the HW-IF 95.

Figure 5:
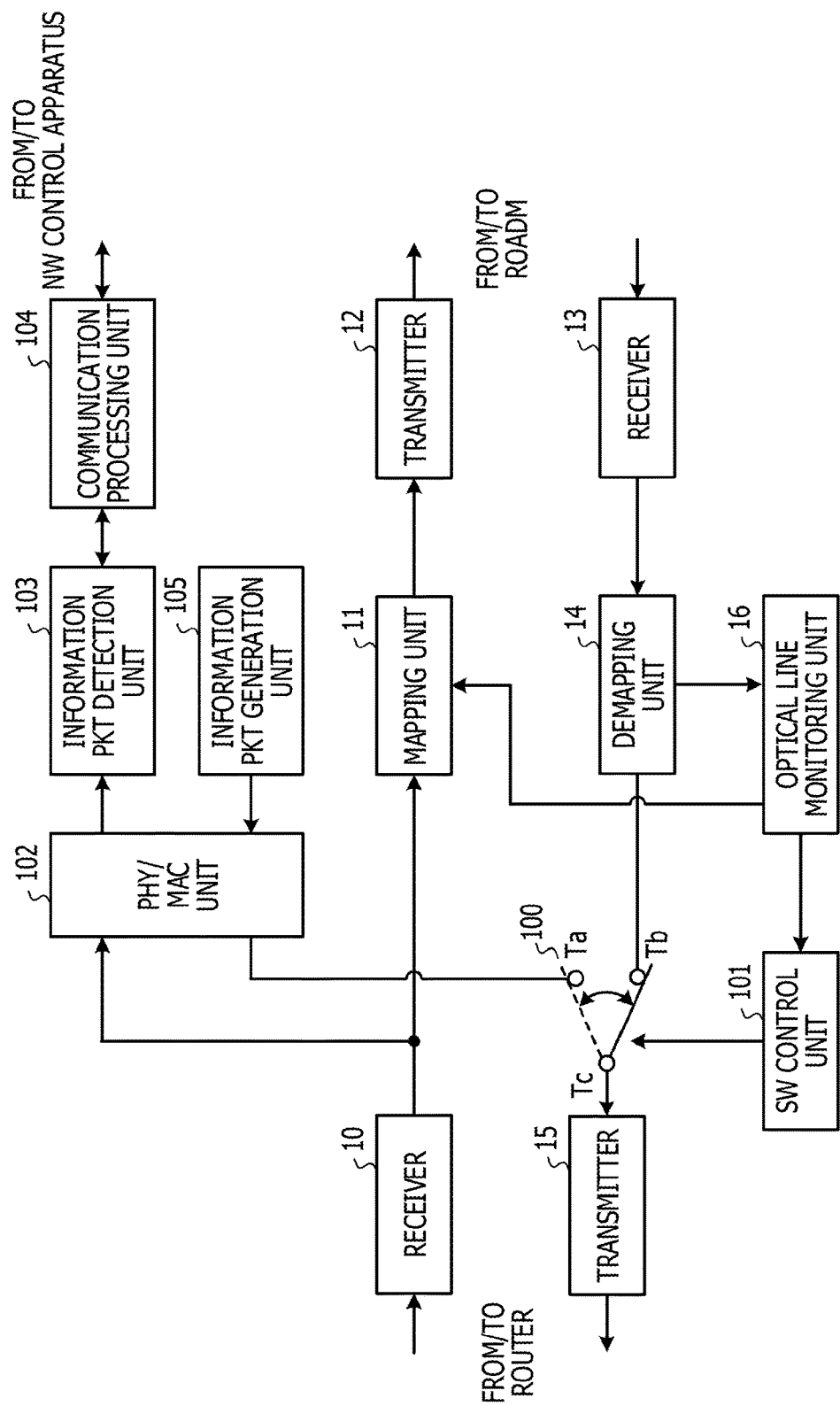
FIG. 5 is a configuration diagram illustrating a transponder according to the first embodiment.

FIG. 5 illustrates a functional configuration of the transponders 1a, 1b according to the first embodiment. In FIG. 5, components common to those of FIG. 2 are assigned with same reference numerals, and description thereof is omitted.

The transmitter 15 is coupled with the demapping unit 14 and the PHY/MAC unit 102 via the switch unit 100. The switch unit 100 includes a terminal Ta leading to the PHY/MAC unit 102, a terminal Tb leading to the demapping unit 14, and a terminal Tc leading to the transmitter 15. The coupling destination of the terminal Tc of the switch unit 100 is changed over to the terminal Ta or the terminal Tb by control of the switch control unit 101. The switch unit 100 is constituted by, for example, a physical switch or a logical circuit.

The switch control unit 101 controls the switch unit 100 based on the instruction signal of the optical line monitoring unit 16. When detected non-setting or fault of the optical line, the optical line monitoring unit 16 outputs the instruction signal such that the coupling destination of the terminal Tc becomes the terminal Ta. When detected setting or fault recovery of the optical line, the optical line monitoring unit 16 outputs the instruction signal such that the coupling destination of the terminal Tc becomes the terminal Tb.

Thus, when the optical line is available, the transmitter 15 receives the Ethernet signal from the demapping unit 14. When the optical line is not available, the transmitter 15 receives the information packet from the PHY/MAC unit 102. In this case, the transmitter 15 transmits the information packet to the routers 2a, 2b.

The PHY/MAC unit 102 is constituted by a logical circuit, for example, such as the ASIC, and transmits and receives the information packet to and from the routers 2a, 2b. The PHY/MAC unit 102 is coupled with the receiver 10, the switch unit 100, the information packet detection unit 103, and the information packet generation unit 105.

The Ethernet signal outputted from the receiver 10 is inputted into the mapping unit 11 and the PHY/MAC unit 102. After subjecting the Ethernet signal to the decoding processing, the PHY/MAC unit 102 outputs the Ethernet signal to the information packet detection unit 103. The information packet detection unit 103 detects the information packet from the Ethernet signal received from the routers 2a, 2b. Information packet detection processing is performed by detecting, for example, data matching a predetermined pattern from data of the Ethernet signal.

The information packet is an example of a detection signal for detecting the adjacency relationship between the routers 2a, 2b in client networks NWa, NWb. As described later, the information packet includes information of the routers 2a, 2b which are adjacent devices (so-called neighbors) of the transponders 1a, 1b. The information packet detection unit 103 acquires information of the routers 2a, 2b from the information packet and stores into the memory 93 as the adjacent device information 930.

The communication processing unit 104 includes, for example, the server function of the network configuration protocol (NETCONF), and processes communication with the WDM network control apparatus 4. The communication processing unit 104, for example, transmits the adjacent device information 930 to the WDM network control apparatus 4 in response to the request from the WDM network control apparatus 4. The communication processing unit 104 is an example of the communication processing circuit.

The information packet generation unit 105 generates the information packet and outputs to the PHY/MAC unit 102. When the terminal Tc of the switch unit 100 is coupled with the terminal Ta, the information packet outputted from the information packet generation unit 105 is transmitted from the transmitter 15 to the routers 2a, 2b. This allows the routers 2a, 2b to recognize the adjacency relationship with the transponders 1a, 1b by receiving the information packet from the transmitter 15.

Thus, when the communication disabled state with corresponding devices, the transponders 1a, 1b is detected, the information packet generation unit 105 as an example of the transmission unit and the transmission circuit transmits the information packet to the routers 2a, 2b. Thus, even when the optical line is not set or a fault occurs, the transponders 1a, 1b and the routers 2a, 2b may easily recognize mutual adjacency relationship.

Figure 6:
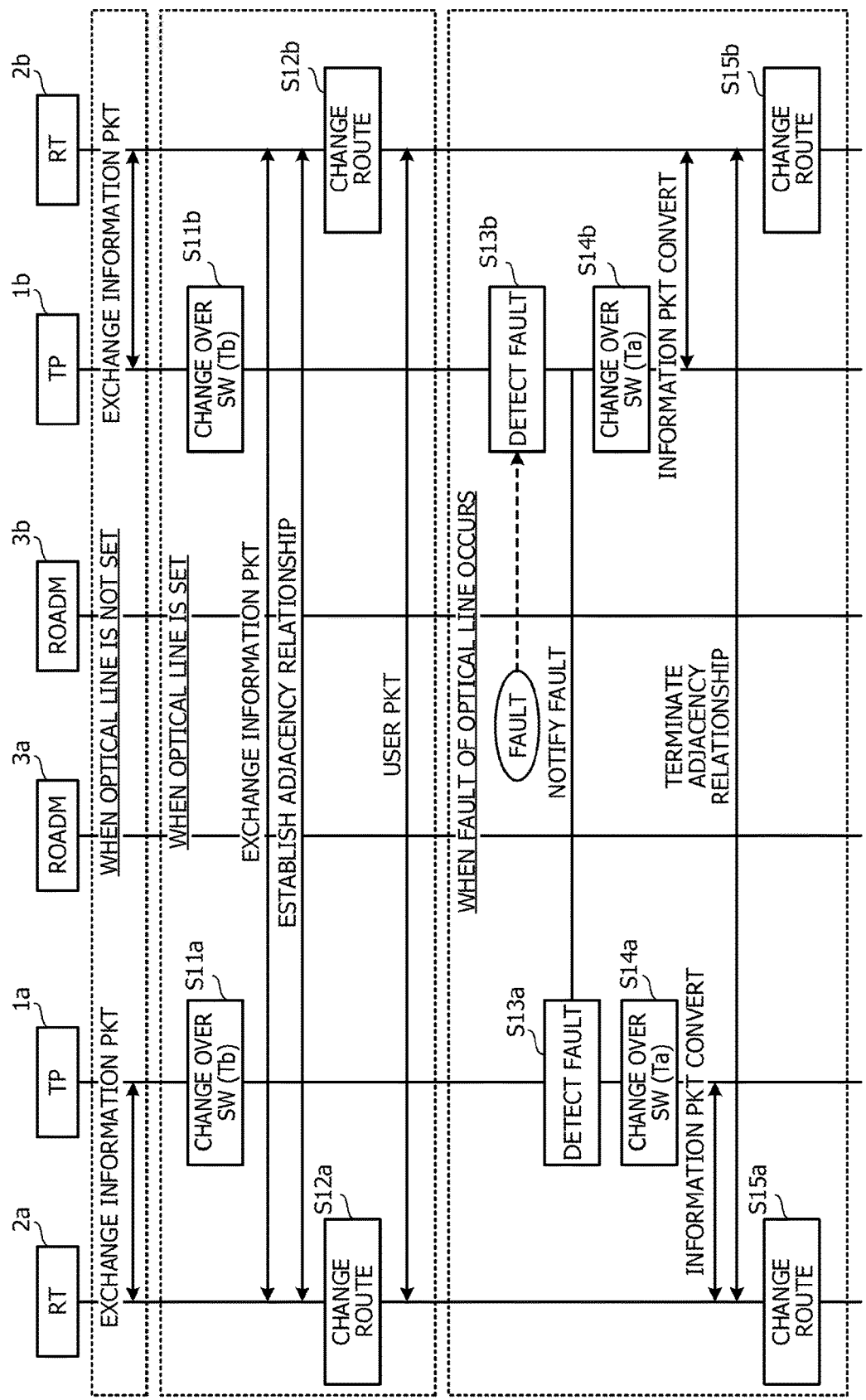
FIG. 6 is a sequence diagram illustrating operation (Part 1) of a communication system according to the first embodiment.
Figure 7:
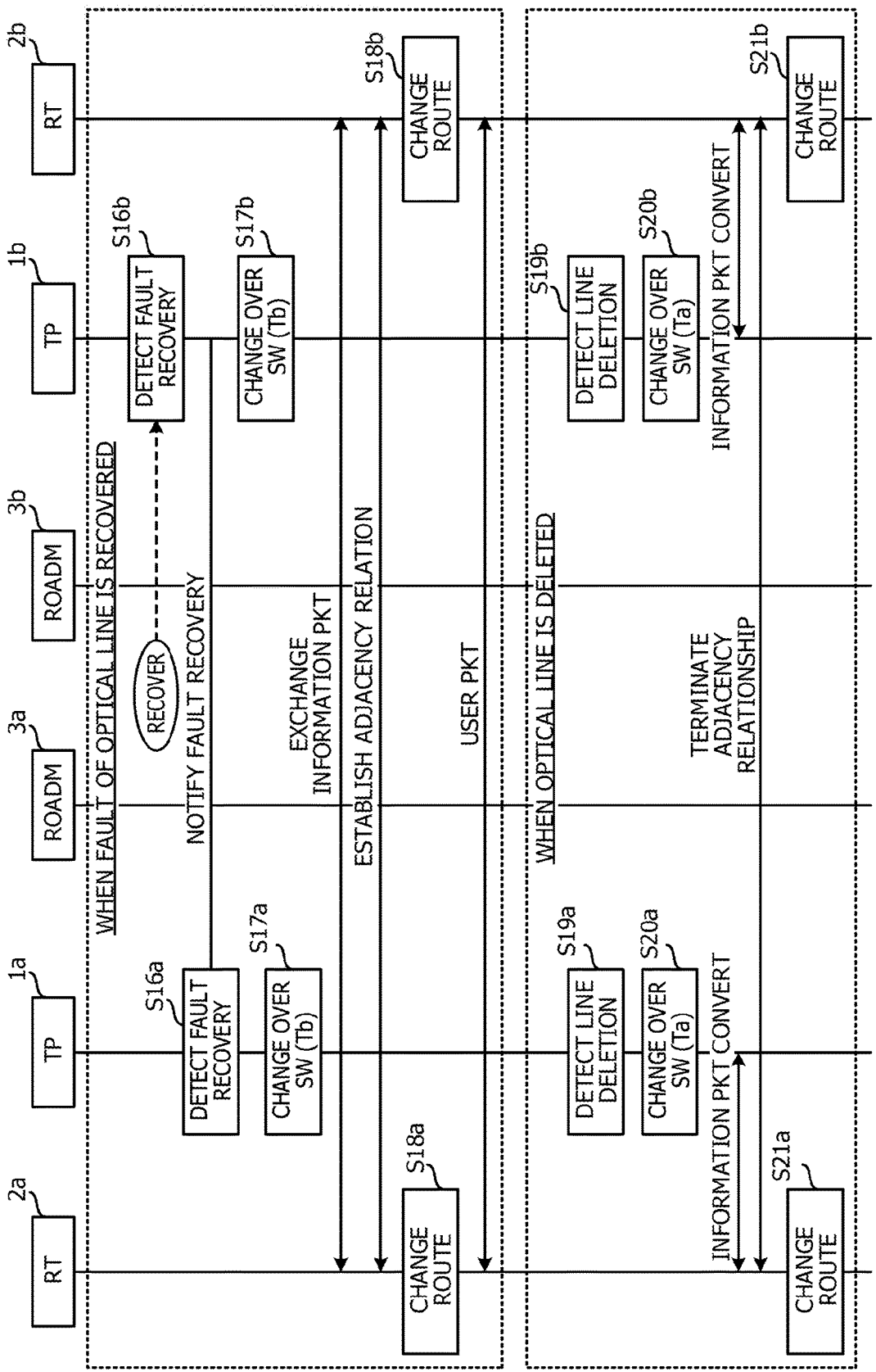
FIG. 7 is a sequence diagram illustrating operation (Part 2) of the communication system according to the first embodiment.

FIGS. 6 and 7 are sequence diagrams illustrating operation of the communication system according to the first embodiment. FIG. 6 illustrates operations when the optical line is not set (see "when optical line is not set"), when the optical line is set (see "when optical line is set"), and when a fault occurs in the optical line (see "when fault occurs in optical line").

First, operation when the optical line is not set is described. In this case, the terminal Tc of the switch unit 100 is coupled with the terminal Ta of the PHY/MAC unit 102. This allows the routers 2a, 2b and the transponders 1a, 1b to exchange the information packet. Thus, the routers 2a, 2b and the transponders 1a, 1b may easily recognize mutual adjacency relationship before the optical line is set.

Next, operation when the optical line is set is described. When the optical line is set by the WDM network control apparatus 4, the switch control unit 101 changes over the coupling destination of the terminal Tc of the switch unit 100 to the terminal Tb of the demapping unit 14 in accordance with the instruction signal of the optical line monitoring unit 16 (reference signs S11a, Slit). This allows communication between the routers 2a, 2b via the optical line. The routers 2a, 2b may establish the adjacency relationship on the OSPF by exchanging the information packet.

Next, the routers 2a, 2b changes the transfer path of the user packet to a path routed through the optical line according to the OSPF (reference signs S12a, S12b). This allows transfer of the user packet between client networks NWa, NWb via the WDM network NWc.

Next, operation when a fault occurs in the optical line is described. For example, when a fault occurs in the optical line in a direction transmitting the optical signal from the ROADM 3a to the ROADM 3b, the optical line monitoring unit 16 of the transponder 1b detects the fault from non-receipt of the optical signal or an error of the optical signal (reference sign S13b). The transmitter 12 of the transponder 1b transmits the optical signal including the fault notification generated by the mapping unit 11 to the transponder 1a of the corresponding device. This causes the optical line monitoring unit 16 of the transponder 1a to detect the fault of the optical line (reference sign S13a).

Optical line monitoring units 16 of the transponders 1a, 1b output the instruction signal to the switch control unit 101 upon detecting the fault to instruct to change over the coupling destination of the terminal Tc of the switch unit 100 to the terminal Ta. The switch control unit 101 changes over the coupling destination of the terminal Tc of the switch unit 100 to the terminal Ta according to the instruction signal (reference signs S14a, S14b).

This couples the transmitter 15 and the PHY/MAC unit 102 with each other. Thus, the information packet generated by the information packet generation unit 105 is transmitted from the transmitter 15 to the routers 2a, 2b. The information packet which the receiver 10 receives from the routers 2a, 2b is inputted from the PHY/MAC unit 102 to the information packet detection unit 103.

This allows the routers 2a, 2b and the transponders 1a, 1b to exchange the information packet. Thus, the routers 2a, 2b and the transponders 1a, 1b may easily recognize mutual adjacency relationship even when a fault occurs in the optical line. Thus, the transponders 1a, 1b may monitor the coupling state with the routers 2a, 2b when a fault occurs.

The routers 2a, 2b are disabled to transfer the packet to each other via the optical line due to occurrence of the fault. Thus, the routers 2a, 2b, for example, detect termination of mutual adjacency relationship in response to the timeout by the hello packet of the OSPF. Thus, the routers 2a, 2b change the transfer path of the user packet from the transfer path routed through the optical line to another transfer path according to the OSPF (reference signs S15a, S15b). Time requested from occurrence of the fault to change of the transfer path is, for example, several tens of seconds.

FIG. 7 illustrates operation when the fault in the optical line is recovered (see "when fault of optical line is recovered") and operation when the optical line is deleted (see "when optical line is deleted").

First, operation when the fault in the optical line is recovered is described. When the fault in the optical line is recovered, the optical line monitoring unit 16 of the transponder 1b detects recovery of the fault from reception of the optical signal or from recovery of the optical signal error (reference sign S16b). The transmitter 12 of the transponder 1b transmits the optical signal including the fault recovery notification generated by the mapping unit 11 to the transponder 1a of the corresponding device. This causes the optical line monitoring unit 16 of the transponder 1a to detect recovery of the fault in the optical line (reference sign S16a).

The optical line monitoring units 16 of the transponders 1a, 1b output the instruction signal to the switch control unit 101 upon detecting the fault recovery to instruct to change over the coupling destination of the terminal Tc of the switch unit 100 to the terminal Tb. The switch control unit 101 changes over the coupling destination of the terminal Tc of the switch unit 100 to the terminal Tb according to the instruction signal (reference signs S17a, S17b).

This allows communication between the routers 2a, 2b via the optical line. The routers 2a, 2b may establish the adjacency relationship on the OSPF by exchanging the information packet.

Next, the routers 2a, 2b change the transfer path of the user packet to a path routed through the optical line according to the OSPF (reference signs S18a, S18b). This allows transfer of the user packet between client networks NWa, NWb via the WDM network NWc.

Next, operation when the optical line is deleted is described. When the WDM network control apparatus 4 deletes the optical line, optical line monitoring units 16 of the transponders 1a, 1b detect that the optical line is deleted, from non-reception of the optical signal or the optical signal error (reference signs S19a, S19b).

The optical line monitoring unit 16 outputs the instruction signal to the switch control unit 101 in response to deletion of the optical line to instruct to change over the coupling destination of the terminal Tc of the switch unit 100 to the terminal Ta. The switch control unit 101 changes over the coupling destination of the terminal Tc of the switch unit 100 to the terminal Ta according to the instruction signal (reference signs S20a, S20b).

This couples the transmitter 15 and the PHY/MAC unit 102 with each other. Thus, the information packet generated by the information packet generation unit 105 is transmitted from the transmitter 15 to the routers 2a, 2b. The information packet which the receiver 10 receives from the routers 2a, 2b is inputted from the PHY/MAC unit 102 to the information packet detection unit 103.

This allows the routers 2a, 2b and the transponders 1a, 1b to exchange the information packet with each other. Thus, the routers 2a, 2b and the transponders 1a, 1b may easily recognize mutual adjacency relationship even when the optical line is deleted. Thus, the transponders 1a, 1b may monitor the coupling state with the routers 2a, 2b even after the optical line is deleted.

The routers 2a, 2b are disabled to transfer the packet to each other via the optical line due to deletion of the optical line. Thus, the routers 2a, 2b, for example, detect termination of mutual adjacency relationship in response to the timeout by the hello packet of the OSPF. Thus, the routers 2a, 2b change the transfer path of the user packet from the transfer path routed through the optical line to another transfer path according to the OSPF (reference signs S21a, S21b). Time requested from deletion of the optical line to change of the transfer path is, for example, several tens of seconds.

Thus, the transponders 1a, 1b and the routers 2a, 2b may easily recognize mutual adjacency relationship in any of the above cases.

Second Embodiment

In the first embodiment, the transponders 1a, 1b are not provided with the function of the link pass through. Thus, the timing of changing the transfer path of the routers 2a, 2b delays from when a fault occurs or when the optical line is deleted. Then, when a fault occurs or when the optical path is deleted, the transponders 1a, 1b may use the link control unit 17 and a timer as in the comparative example to decouple the link with the routers 2a, 2b after waiting for a predetermined time for changing the transfer path.

Figure 8:
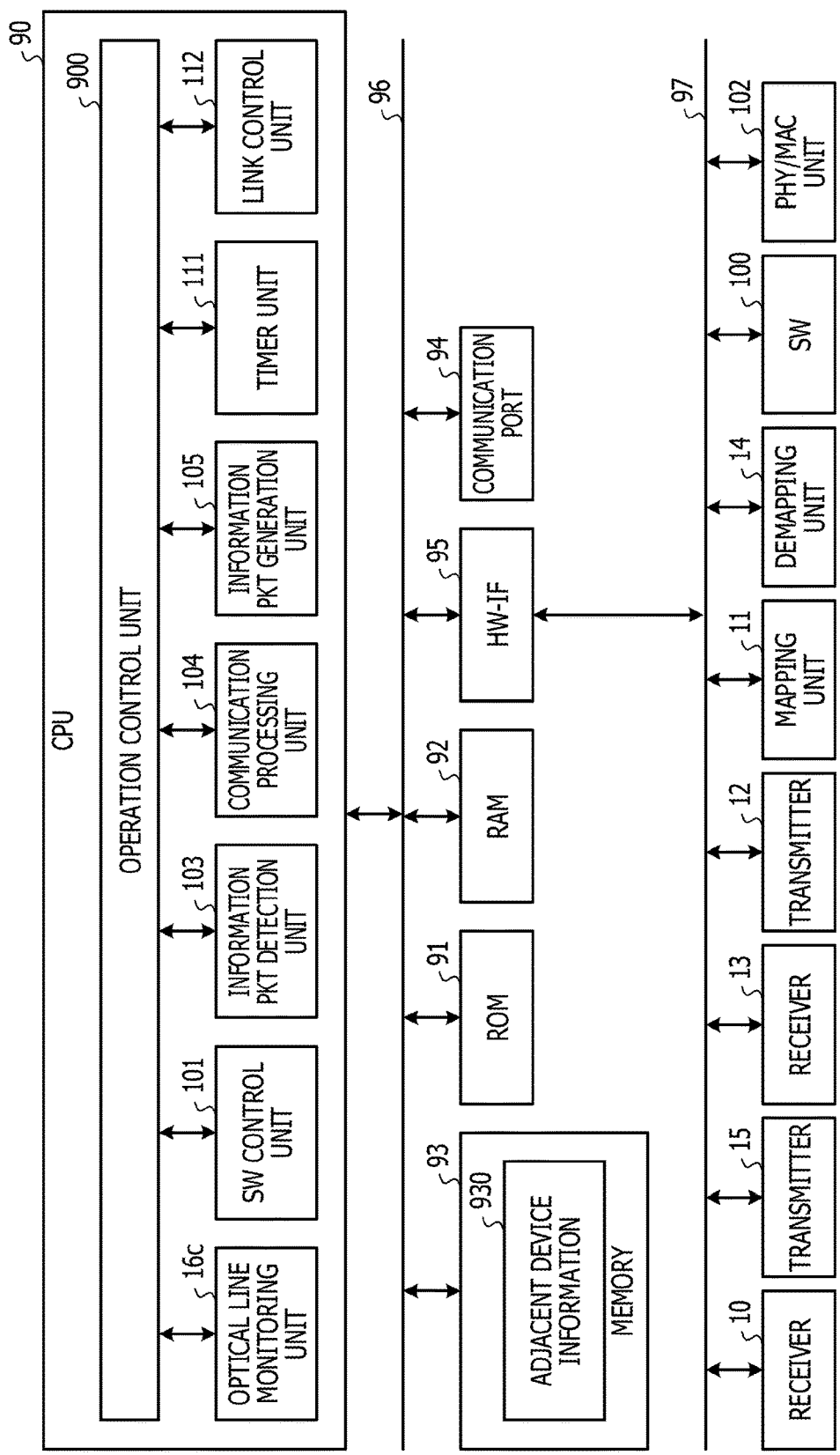
FIG. 8 is a configuration diagram illustrating a transponder according to a second embodiment.

FIG. 8 is a configuration diagram illustrating the transponders 1a, 1b according to the second embodiment. In FIG. 8, components common to those of FIG. 4 are assigned with same reference numerals, and description thereof is omitted.

Upon reading the program from the ROM 91, the CPU 90 creates, as functions, the operation control unit 900, an optical line monitoring unit 16c, the switch control unit 101, an information packet detection unit 103, the communication processing unit 104, the information packet generation unit 105, a timer unit 111, and a link control unit 112. The operation control unit 900 causes the optical line monitoring unit 16c, the switch control unit 101, the information packet detection unit 103, the communication processing unit 104, the information packet generation unit 105, the timer unit 111, and the link control unit 112 to operate in cooperation with the receivers 10, 13, transmitters 12, 15, the mapping unit 11, the demapping unit 14, the switch unit 100, and the PHY/MAC unit 102 by the HW-IF 95.

Figure 9:
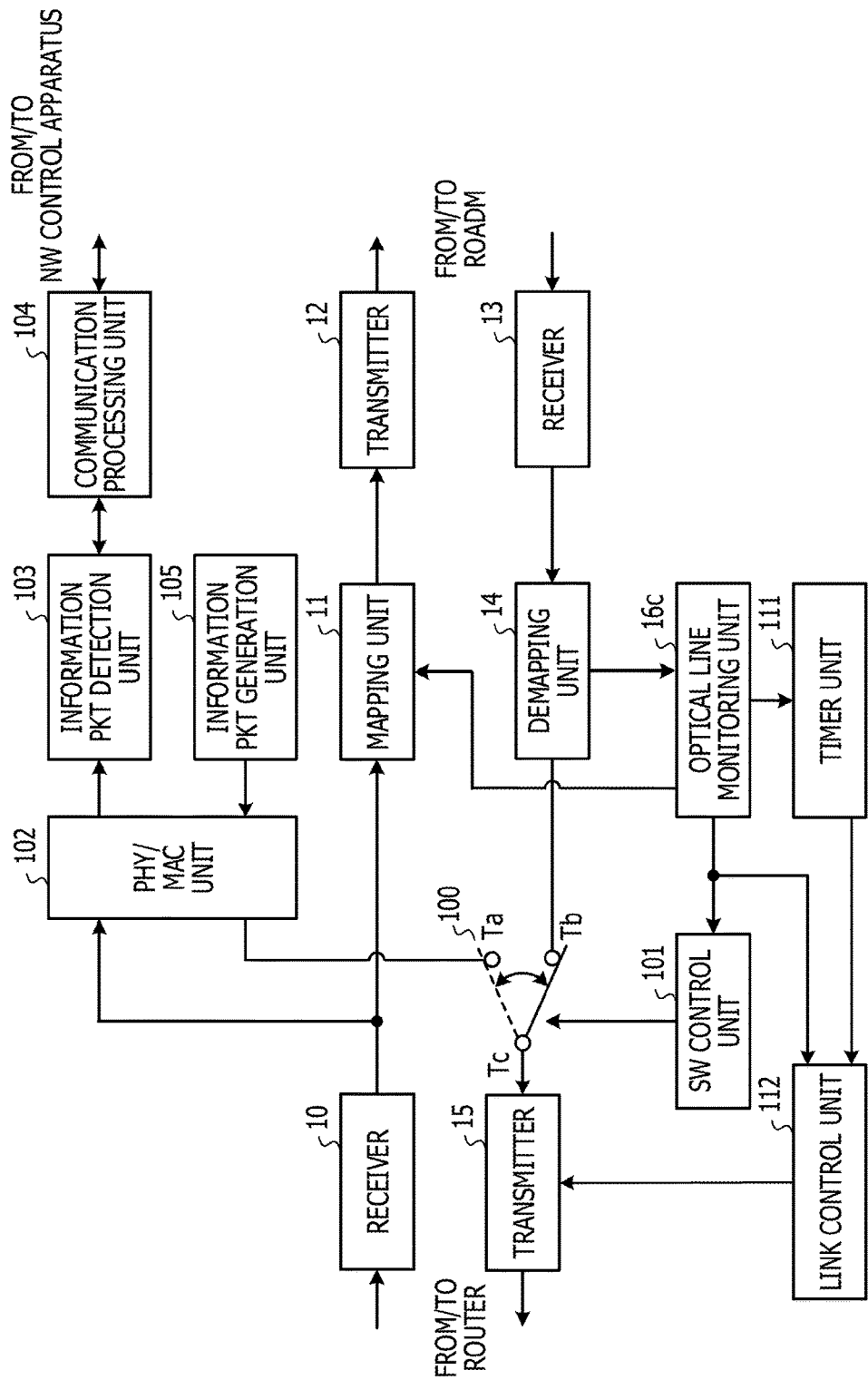
FIG. 9 illustrates a functional configuration of a transponder according to the second embodiment.

FIG. 9 illustrates a functional configuration of the transponders 1a, 1b according to the second embodiment. In addition to the function of the above optical line monitoring unit 16, the optical line monitoring unit 16c includes control functions of the link control unit 112 and the timer unit 111.

The optical line monitoring unit 16c is an example of the detection unit, and is configured to detect the communication disabled state with corresponding devices, the transponders 1a, 1b. More specifically, in the same manner as the optical line monitoring unit 16 of the above embodiment, the optical line monitoring unit 16c detects non-setting or fault of the optical path, or setting or fault recovery of the optical line.

When detected a fault, fault recovery, setting or deletion of the optical path, the optical line monitoring unit 16c outputs the instruction signal to the switch control unit 101 and the link control unit 112. When fault or deletion of the optical line is detected, the switch control unit 101 couples the terminal Tc of the switch unit 100 to the terminal Ta on the side of the PHY/MAC unit 102 according to the instruction signal.

When fault or deletion of the optical line is detected, the link control unit 112 decouples the link with the routers 2a, 2b by controlling the transmitter 15 according to the instruction signal. More specifically, the link control unit 112 notifies the fault of the optical line to the routers 2a, 2b by the function of the link pass through.

Thus, when fault or deletion of the optical line is detected, the routers 2a, 2b may promptly (for example, in less than one second) change the transfer path of the user packet. However, even when the terminal Tc of the switch unit 100 is coupled with the terminal Ta, the information packet generation unit 105 is unable to transmit the information packet to the routers 2a, 2b while the link is decoupled.

Then, when fault or deletion of the optical line is detected, the optical line monitoring unit 16c instructs the timer unit 111 to start (start of time counting) the timer. The timer unit 111, for example, counts a time sufficient for the processing of changing the transfer path by the routers 2a, 2b. The timer unit 111 notifies expiration of the timer to the link control unit 112.

The link control unit 112 couples the link with the routers 2a, 2b again by controlling the transmitter 15 in response to the notification of the timer expiration. More specifically, the link control unit 112, for example, controls output of the transmitter 15 to the on state. This allows the information packet generation unit 105 to transmit the information packet to the routers 2a, 2b.

Thus, the information packet generation unit 105 transmits the information packet after elapse of a predetermined time since the communication disabled state with corresponding devices, the transponders 1a, 1b is detected. Thus, when fault or deletion of the optical line is detected, the transponders 1a, 1b and the routers 2a, 2b may recognize mutual adjacency relationship by exchanging the information packet with each other after the transfer path of the routers 2a, 2b is changed. More specifically, an aspect of the second embodiment advances the timing of changing the transfer path of the routers 2a, 2b than in the first embodiment, and thereby reducing loss of the user packet caused by fault or deletion of the optical line.

Figure 10:
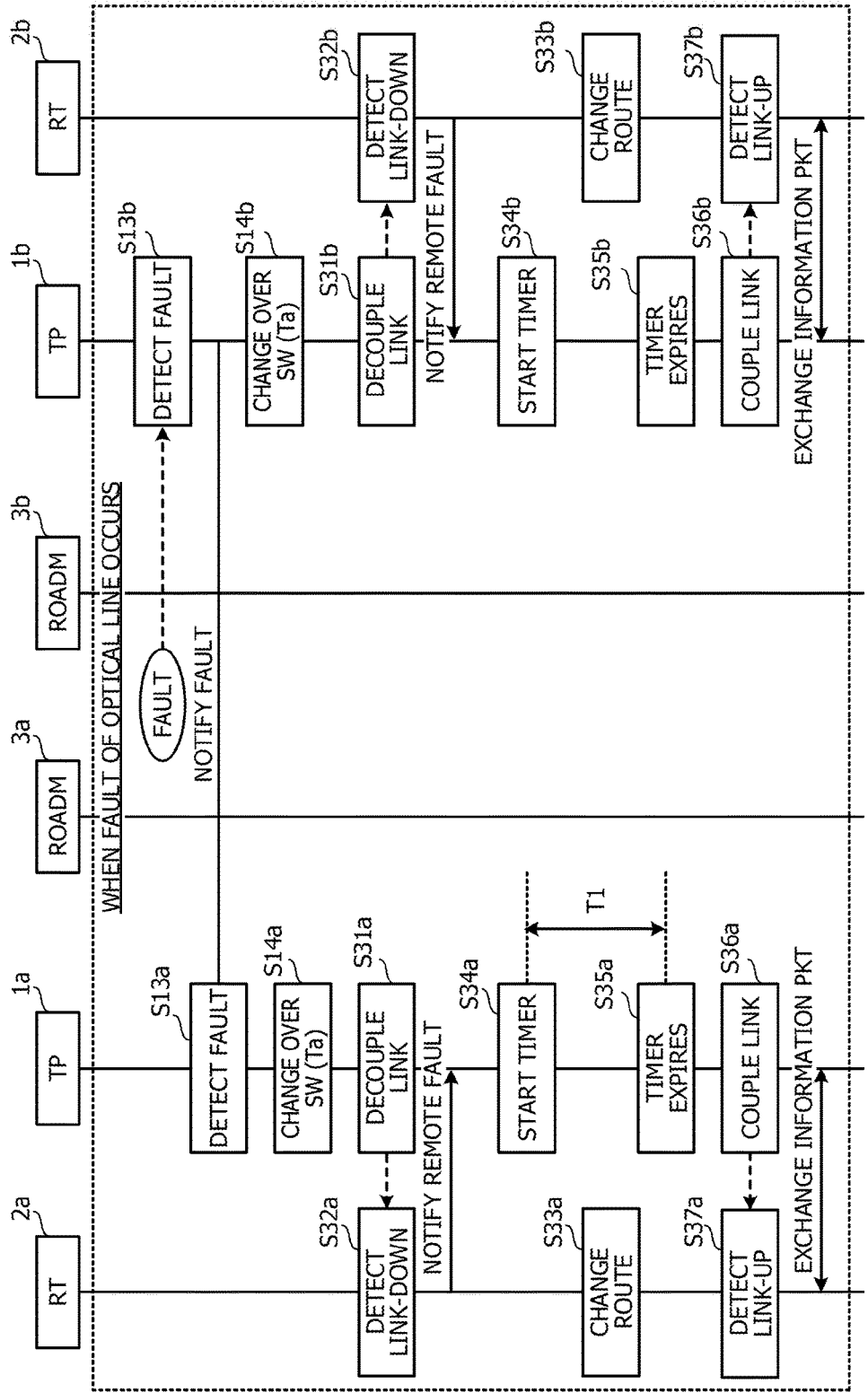
FIG. 10 is a sequence diagram illustrating operation (Part 1) of a communication system according to the second embodiment.
Figure 11:
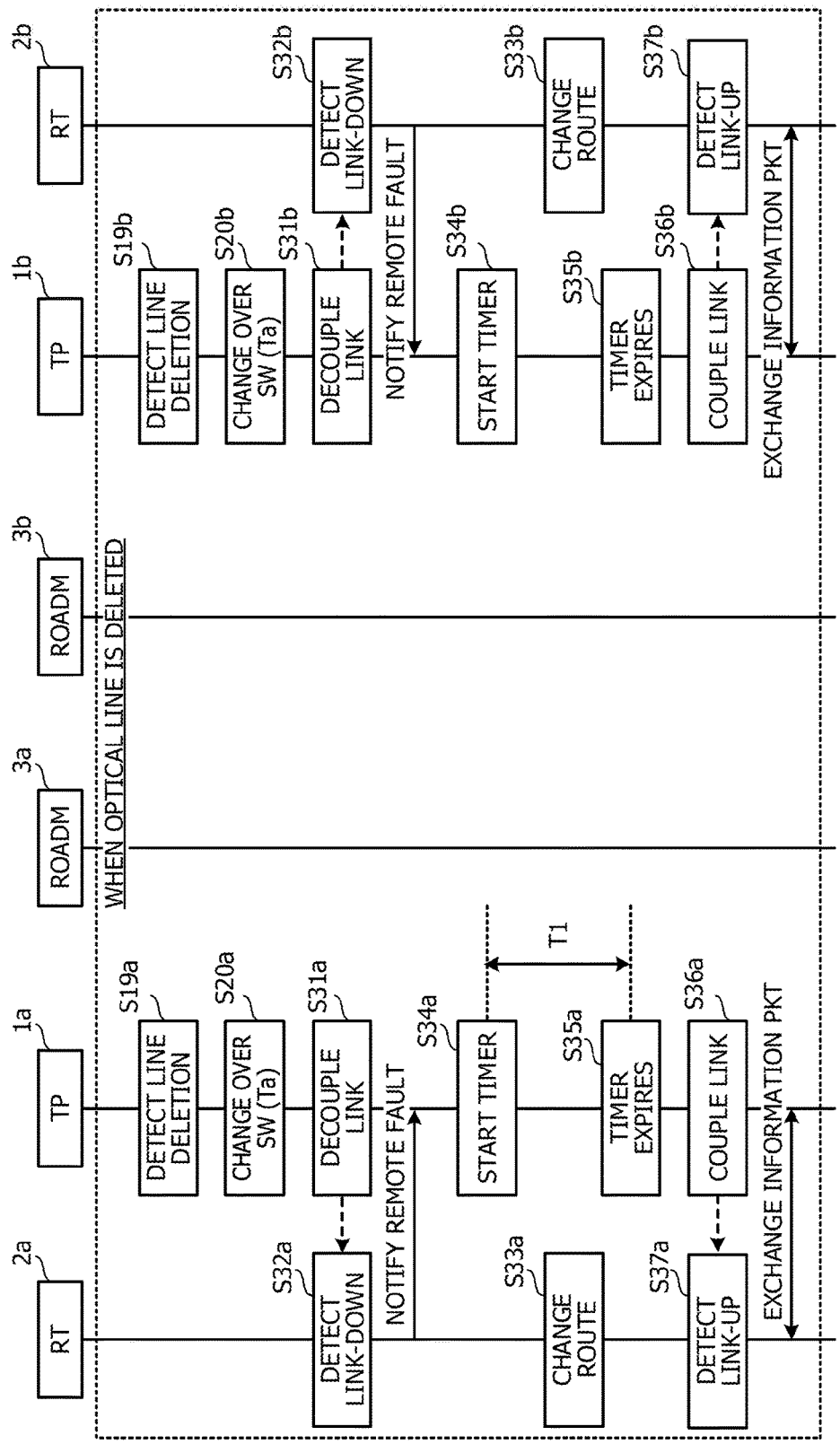
FIG. 11 is a sequence diagram illustrating operation (Part 2) of the communication system according to the second embodiment.

FIGS. 10 and 11 are sequence diagrams illustrating operation of the communication system according to the second embodiment. FIG. 10 illustrates operation when fault or deletion of the optical line (see "when fault occurs in optical line") occurs. In FIG. 10, components common to those of FIG. 6 are assigned with same reference numerals, and description thereof is omitted.

Operation when the optical line is not set is the same as the operation of the first embodiment. More specifically, when the optical line monitoring unit 16c detects non-setting of the optical line, the switch control unit 101 changes over the coupling destination of the terminal Tc of the switch unit 100 to the terminal Ta on the side of the PHY/MAC unit 102. This couples the PHY/MAC unit 102 to the transmitter 15, allowing the information packet generation unit 105 to transmit the information packet to the routers 2a, 2b via the transmitter 15.

Operation when the optical line is set is also the same as the operation of the first embodiment. More specifically, when the optical line monitoring unit 16c detects setting of the optical line, the switch control unit 101 changes over the coupling destination of the terminal Tc of the switch unit 100 to the terminal Tb on the side of the demapping unit 14. This couples the demapping unit 14 to the transmitter 15, thus allowing the transponders 1a, 1b to convert the optical signal received from the optical line into the Ethernet signal and transmit to the routers 2a, 2b.

When a fault occurs in the optical line, the switch control unit 101 changes over the coupling destination of the terminal Tc of the switch unit 100 to the terminal Ta on the side of the PHY/MAC unit 102 according to the instruction signal of the optical line monitoring unit 16c (reference signs S14a, S14b). The link control unit 112 decouples the link with the routers 2a, 2b according to the instruction signal of the optical line monitoring unit 16c (reference signs S31a, S31b). Further, the timer unit 111 causes the timer to start at the substantially same timing with the link decoupling according to the instruction signal of the optical line monitoring unit 16c (reference signs S34a, S34b).

Each of the routers 2a, 2b detects link-down when the link is decoupled (reference signs S32a, S32b). Then, upon detecting the link-down, each of the routers 2a, 2b outputs "Remote Fault" notification to the transponders 1a, 1b. Next, each of the routers 2a, 2b determines from "Remote Fault" notification that transfer paths passing through the transponders 1a, 1b are not available, and changes the transfer path of the user packet in accordance with the OSPF (reference signs S33a, S33b).

This allows the routers 2a, 2b to, for example, promptly change the transfer path in response to the fault of optical line without waiting for termination of the adjacency relationship with other routers 2b, 2a by the timeout of the hello packet of the OSPF.

The timer unit 111 counts a predetermined time T1 with the timer. The predetermined time T1 is preset to a time sufficient for the processing of changing the transfer path of the routers 2a, 2b. Upon detecting expiration of the timer (reference signs S35a, S35b), the timer unit 111 notifies to that effect to the link control unit 112.

In response to the notification of the timer expiration, the link control unit 112 couples the link with the routers 2a, 2b (reference signs S36a, S36b). This allows the transmitter 15 to transmit the Ethernet signal to the routers 2a, 2b. Thus, the information packet generation unit 105 may transmit the information packet to the routers 2a, 2b via the transmitter 15.

The routers 2a, 2b detect the link-up with the transponders 1a, 1b by receiving the Ethernet signal (for example, idle signal) from the transmitter 15 (reference signs S37a, S37b).

This allows the routers 2a, 2b and the transponders 1a, 1b to exchange the information packet with each other. Thus, the routers 2a, 2b and the transponders 1a, 1b may easily recognize mutual adjacency relationship even when a fault occurs in the optical line. Thus, the transponders 1a, 1b may monitor the coupling state with the routers 2a, 2b when a fault occurs.

Thus, when the optical line monitoring unit 16c detects the communication disabled state with corresponding devices, the transponders 1a, 1b, the link control unit 112, as an example of the stop control unit and the stop control circuit, causes the transmitter 15 to stop transmission of the Ethernet signal and, after elapse of a predetermined time T1 therefrom, causes the transmitter 15 to resume transmission of the Ethernet signal.

Thus, the transponders 1a, 1b may notify the optical line disabled state to the routers 2a, 2b by decoupling the link with the routers 2a, 2b. Therefore, the routers 2a, 2b promptly changes the transfer path in response to the fault of the optical line, thus reducing the loss of the user packet caused by the fault. The transponders 1a, 1b resume transmission of the Ethernet signal to the transmitter 15 after elapse of a predetermined time T1. Thus, the information packet is transmitted to the routers 2a, 2b after the transfer path of the routers 2a, 2b has been changed.

FIG. 11 illustrates operation when the optical line is deleted (see "when optical line is deleted"). In FIG. 11, components common to those of FIGS. 7 and 10 are assigned with same reference numerals, and description thereof is omitted.

Operation when the fault of the optical line is recovered is the same as the operation of the first embodiment. More specifically, when the optical line monitoring unit 16c detects fault recovery of the optical line, the switch control unit 101 changes over the coupling destination of the terminal Tc of the switch unit 100 to the terminal Tb on the side of the demapping unit 14. This couples the demapping unit 14 to the transmitter 15, thus allowing the transponders 1a, 1b to convert the optical signal received from the optical line into the Ethernet signal and transmit to the routers 2a, 2b.

Upon detecting deletion of the optical line (reference signs S19a, S19b), the optical line monitoring unit 16 of the transponders 1a, 1b outputs the instruction signals to the switch control unit 101 to change over the coupling destination of the terminal Tc of the switch unit 100 to the terminal Ta on the side of the PHY/MAC unit 102 (reference signs S20a, S20b). Thereafter, operations illustrated in above signs S31a to S37a and S31b to S37b are implemented.

Thus, the routers 2a, 2b and the transponders 1a, 1b may easily recognize mutual adjacency relationship with each other even when the optical line is deleted. Thus, the transponders 1a, 1b may monitor the coupling state with the routers 2a, 2b even after the optical line is deleted.

In the second embodiment, the information packet generation unit 105 transmits the information packet after elapse of a predetermined time T1 since the communication disabled state with corresponding devices, the transponders 1a, 1b is detected. Thus, the transponders 1a, 1b may recognize the adjacency relationship after the transfer path of the routers 2a, 2b has been changed.

Third Embodiment

In the second embodiment, the transponders 1a, 1b notifies non-setting or fault of the optical line to the routers 2a, 2b by decoupling the link with the routers 2a, 2b. However, the transponders 1a, 1b may notify "Remote Fault" (or "Local Fault") specified in the IEEE 802.3 to the routers 2a, 2b instead of decoupling the link.

Figure 12:
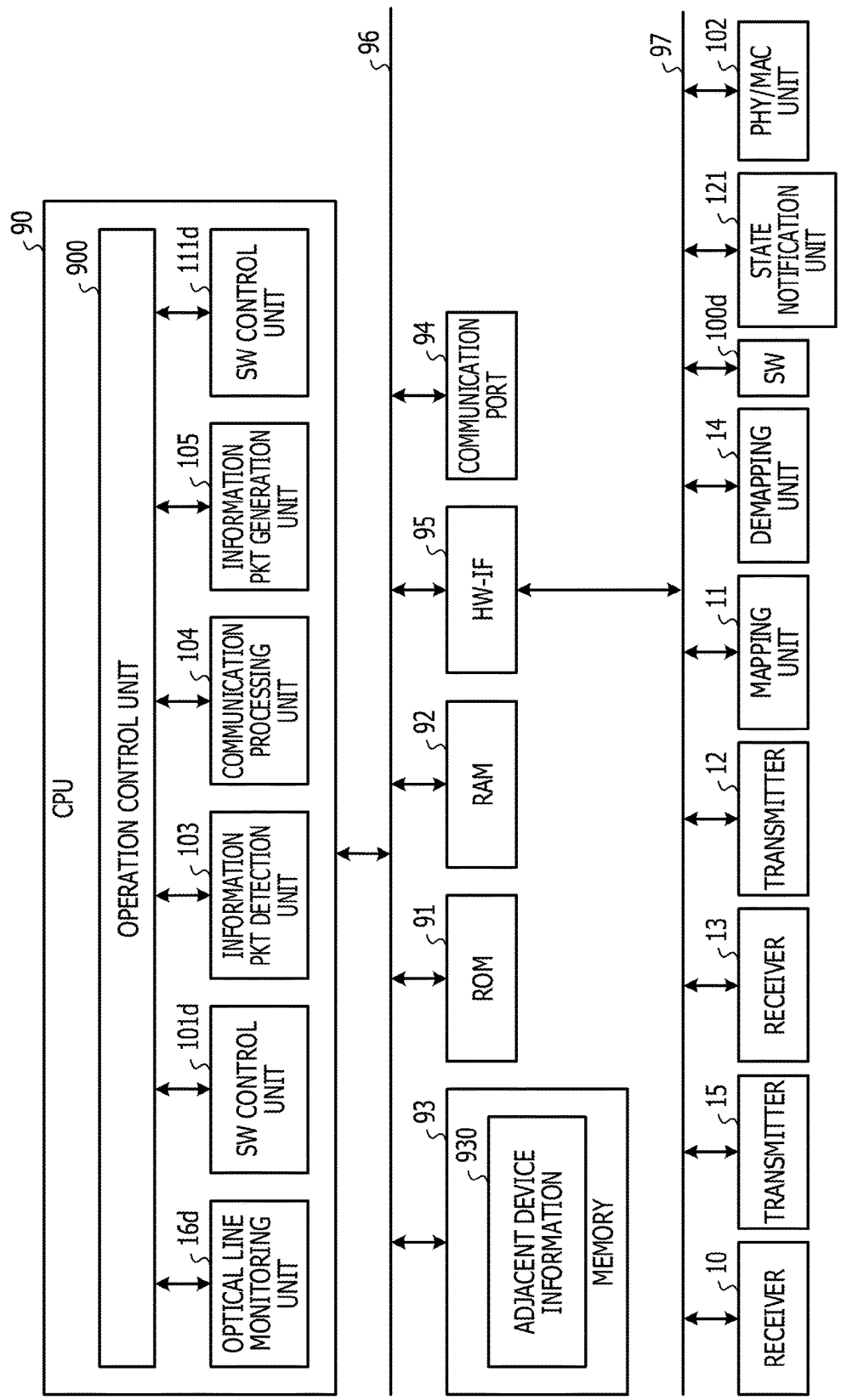
FIG. 12 is a configuration diagram illustrating a transponder according to a third embodiment.

FIG. 12 is a configuration diagram illustrating the transponders 1a, 1b according to the third embodiment. In FIG. 12, components common to those of FIG. 4 are assigned with same reference numerals, and description thereof is omitted.

The transponders 1a, 1b include the CPU 90, the ROM 91, the RAM 92, the memory 93, the communication port 94, the HW-IF 95, the receivers 10, 13, the transmitters 12, 15, the mapping unit 11, the demapping unit 14, a switch unit 100d, a state notification unit 121, and the PHY/MAC unit 102. Upon reading the program from the ROM 91, the CPU 90 creates, as functions, the operation control unit 900, an optical line monitoring unit 16d, a switch control unit 101d, the information packet detection unit 103, the communication processing unit 104, the information packet generation unit 105, and a timer unit 111d.

The operation control unit 900 causes the optical line monitoring unit 16d, the switch control unit 101d, the information packet detection unit 103, the communication processing unit 104, the information packet generation unit 105, and the timer unit 111d to operate in cooperation with the receivers 10, 13, transmitters 12, 15, the mapping unit 11, the demapping unit 14, the switch unit 100d, the state notification unit 121, and the PHY/MAC unit 102 via the HW-IF 95.

Figure 13:
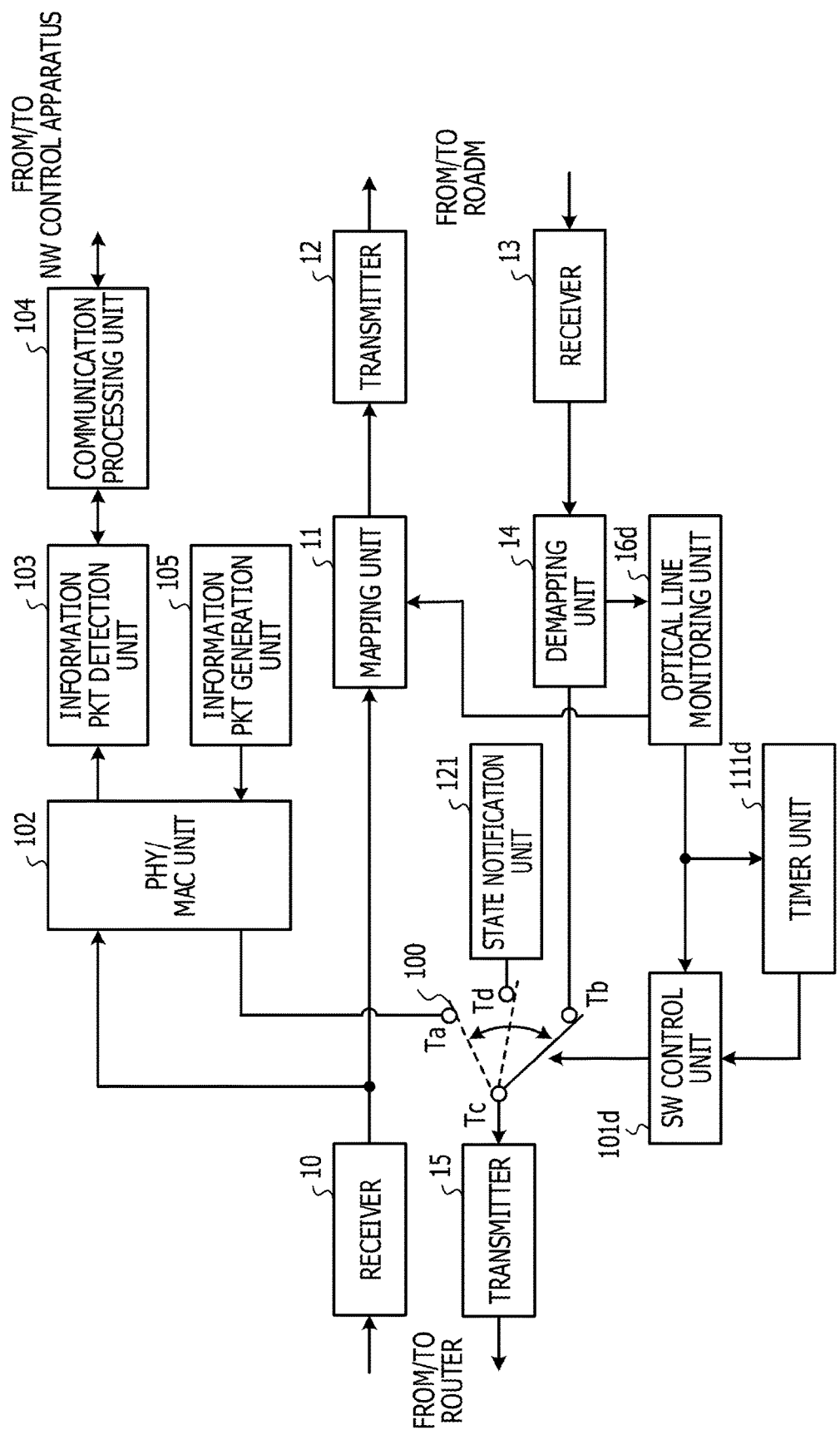
FIG. 13 illustrates a functional configuration of a transponder according to the third embodiment.

FIG. 13 illustrates a functional configuration of the transponders 1a, 1b according to the third embodiment. In FIG. 13, components common to those of FIG. 5 are assigned with same reference numerals, and description thereof is omitted.

The transmitter 15 is coupled with the demapping unit 14, the PHY/MAC unit 102, and the state notification unit 121 via the switch unit 100d. The switch unit 100d includes a terminal Ta leading to the PHY/MAC unit 102, a terminal Tb leading to the demapping unit 14, a terminal Tc leading to the transmitter 15, and a terminal Td leading to the state notification unit 121. In other words, the switch unit 100d is the switch unit 100 of first and second embodiments to which the terminal Td is added.

In the switch unit 100d, the coupling destination of the terminal Tc is changed over to the terminal Ta, the terminal Tb, or the terminal Td by control of the switch control unit 101d. The switch unit 100d is constituted by, for example, a physical switch or a logical circuit.

The state notification unit 121 is an example of the notification unit and the notification circuit. When the terminal Tc of the switch unit 100d is coupled to the terminal Td, the state notification unit 121 notifies the communication disabled state with corresponding devices, the transponders 1a, 1b to the routers 2a, 2b of the client networks NWa, NWb. More specifically, the state notification unit 121 transmits the "Remote Fault" notification to the routers 2a, 2b via the transmitter 15. The routers 2a, 2b change the transfer path in response to the "Remote Fault" notification. The state notification unit 121 is constituted by, for example, a logical circuit including the FPGA.

The optical line monitoring unit 16d is an example of the detection unit, and is configured to detect the communication disabled state with corresponding devices, the transponders 1a, 1b. More specifically, in the same manner as the optical line monitoring units 16, 16c of the above embodiments, the optical line monitoring unit 16d detects non-setting and fault of the optical line and detects setting and fault restoration of the optical line.

When detected non-setting or fault of the optical line, the optical line monitoring unit 16d outputs the instruction signal to the switch control unit 101d to change over the coupling destination of the terminal Tc of the switch unit 100d to the terminal Td on the side of the state notification unit 121. The switch control unit 101d changes over the coupling destination of the terminal Tc of the switch unit 100d to the terminal Td on the side of the state notification unit 121 according to the instruction signal.

When the optical line monitoring unit 16d detects non-setting or fault of the optical line, or communication disabled state with corresponding devices, the transponders 1a, 1b, the state notification unit 121 notifies the communication disabled state with corresponding devices, the transponders 1a, 1b to the routers 2a, 2b. This allows the routers 2a, 2b to promptly change the transfer path without decoupling the link with the transponders 1a, 1b even when use of the optical line is not available.

The instruction signal of the optical line monitoring unit 16d is inputted into not only the switch control unit 101d but also the timer unit 111d. The timer unit 111d causes the timer to start in response to input of the instruction signal to count a time sufficient for changing the transfer path of the routers 2a, 2b. The timer unit 111d notifies expiration of the timer to the switch control unit 101d. In response to the notification of the timer expiration, the switch control unit 101d changes over the coupling destination of the terminal Tc of the switch unit 100d to the terminal Ta on the side of the PHY/MAC unit 102.

This allows the transponders 1a, 1b to exchange the information packet with the routers 2a, 2b after the transfer path of the routers 2a, 2b is changed.

Figure 14:
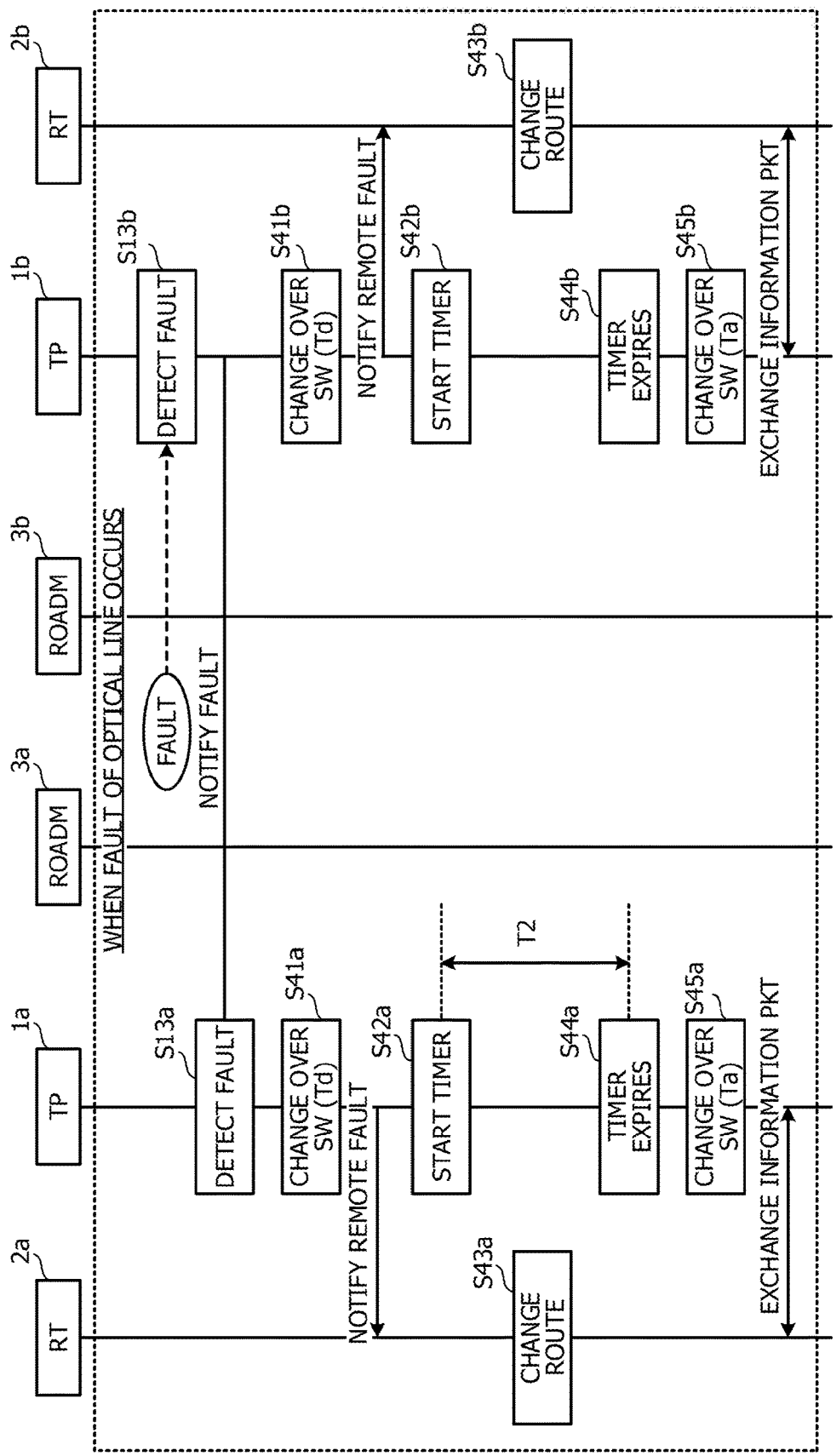
FIG. 14 is a sequence diagram illustrating operation (Part 1) of a communication system according to the third embodiment.
Figure 15:
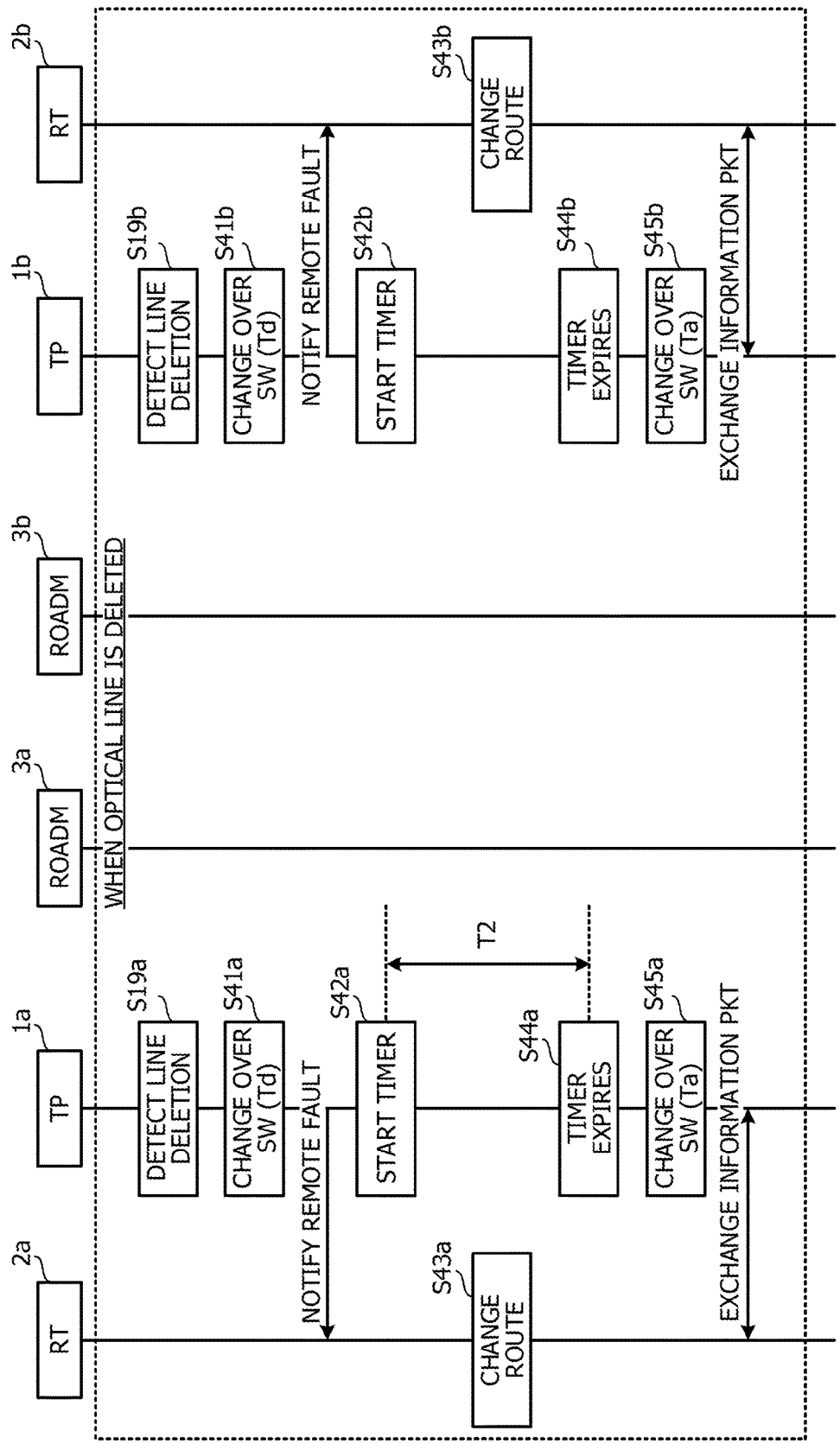
FIG. 15 is a sequence diagram illustrating operation (Part 2) of the communication system according to the third embodiment.

FIGS. 14 and 15 are sequence diagrams illustrating operation of the communication system according to the third embodiment. FIG. 14 illustrates operation when fault of the optical line occurs (see "when fault occurs in optical line"). In FIG. 14, components common to those of FIG. 6 are assigned with same reference numerals, and description thereof is omitted.

Operation when the optical line is not set is the same as the operation of the first embodiment. More specifically, when non-setting of the optical line is detected by the optical line monitoring unit 16d, the switch control unit 101d changes over the coupling destination of the terminal Tc of the switch unit 100d to the terminal Ta on the side of the PHY/MAC unit 102. This couples the PHY/MAC unit 102 to the transmitter 15, allowing the information packet generation unit 105 to transmit the information packet to the routers 2a, 2b via the transmitter 15.

Operation when the optical line is set is also the same as the operation of the first embodiment. More specifically, when setting of the optical line is detected by the optical line monitoring unit 16d, the switch control unit 101d changes over the coupling destination of the terminal Tc of the switch unit 100 to the terminal Tb on the side of the demapping unit 14. This couples the demapping unit 14 to the transmitter 15, thus allowing the transponders 1a, 1b to convert the optical signal received from the optical line into the Ethernet signal and transmit to the routers 2a, 2b.

When a fault occurs in the optical line, the switch control unit 101d changes over the coupling destination of the terminal Tc of the switch unit 100d to the terminal Td on the side of the state notification unit 121 according to the instruction signal of the optical line monitoring unit 16d (reference signs S41a, S41b). This allows the state notification unit 121 to transmit the "Remote Fault" notification to the routers 2a, 2b via the transmitter 15. In accordance with the instruction signal of the optical line monitoring unit 16d, the timer unit 111d causes the timer to start at the substantially same timing with transmission of the "Remote Fault" notification (reference signs S42a, S42b).

Each of the routers 2a, 2b determines from the "Remote Fault" notification that transfer paths passing through the transponders 1a, 1b are not available, and changes the transfer path of the user packet in accordance with the OSPF (reference signs S43a, S43b).

The timer unit 111d counts a predetermined time T2 with the timer. The predetermined time T2 is preset to a time sufficient for the processing of changing the transfer path of the routers 2a, 2b. Upon detecting expiration of the timer (reference signs S44a, S44b), the timer unit 111d notifies to that effect to the switch control unit 101d.

In response to the notification of the timer expiration, the switch control unit 101d changes over the coupling destination of the terminal Tc of the switch unit 100d to the terminal Ta on the side of the PHY/MAC unit 102 (reference signs S45a, S45b). This couples the transmitter 15 to the PHY/MAC unit 102, allowing the information packet generation unit 105 to transmit the information packet to the routers 2a, 2b via the transmitter 15.

This allows the routers 2a, 2b and the transponders 1a, 1b to exchange the information packet. Thus, the routers 2a, 2b and the transponders 1a, 1b may easily recognize mutual adjacency relationship even when a fault occurs in the optical line. Thus, the transponders 1a, 1b may monitor the coupling state with the routers 2a, 2b when a fault occurs.

Thus, when a fault of the optical line is detected by the optical line monitoring unit 16d, the state notification unit 121 notifies the "Remote Fault" to the routers 2a, 2b. This allows the routers 2a, 2b, even when a fault occurs in the optical line, to promptly change the transfer path in response to the notification from the transponders 1a, 1b without decoupling the link with the transponders 1a, 1b.

FIG. 15 illustrates operation when the optical line is deleted (see "when optical line is deleted"). In FIG. 15, components common to those of FIGS. 7 and 14 are assigned with same reference numerals, and description thereof is omitted.

Operation when the fault of the optical line is recovered is the same as the operation of the first embodiment. More specifically, when fault recovery of the optical line is detected by the optical line monitoring unit 16d, the switch control unit 101d changes over the coupling destination of the terminal Tc of the switch unit 100d to the terminal Tb on the side of the demapping unit 14. This couples the demapping unit 14 to the transmitter 15, thus allowing the transponders 1a, 1b to convert the optical signal received from the optical line into the Ethernet signal and transmit to the routers 2a, 2b.

Upon detecting deletion of the optical line (reference signs S19a, S19b), the optical line monitoring unit 16 of the transponders 1a, 1b outputs the instruction signals to the switch control unit 101 so as to change over the coupling destination of the terminal Tc of the switch unit 100d to the terminal Td on the side of the state notification unit 121 (reference signs S41a, S41b). Thereafter, operations illustrated by above reference signs S42a to S45a and S42b to S45b are implemented.

Thus, when deletion of the optical line is detected by the optical line monitoring unit 16d, the state notification unit 121 notifies the "Remote Fault" to the routers 2a, 2b. This allows the routers 2a, 2b, even when the optical line is deleted, to promptly change the transfer path in response to the notification from the transponders 1a, 1b without decoupling the link with the transponders 1a, 1b.

In the third embodiment, when the communication disabled state with corresponding devices, the transponders 1a, 1b is detected by the optical line monitoring unit 16d, the state notification unit 121 notifies the communication disabled state with corresponding devices to the client networks NWa, NWb. This allows the routers 2a, 2b, even when use of the optical line is not available, to promptly change the transfer path in response to the notification from the transponders 1a, 1b without decoupling the link with the transponders 1a, 1b.

Fourth Embodiment

In the third embodiment, the timer unit 111d causes the timer to start when the "Remote Fault" notification is transmitted in response to fault or deletion of the optical line. However, the timer may be caused to start when the "Remote Fault" notification is received from the routers 2a, 2b. In this case, timer expiration time may be easily estimated without considering the transmission delay between the transponders 1a, 1b and the routers 2a, 2b.

Figure 16:
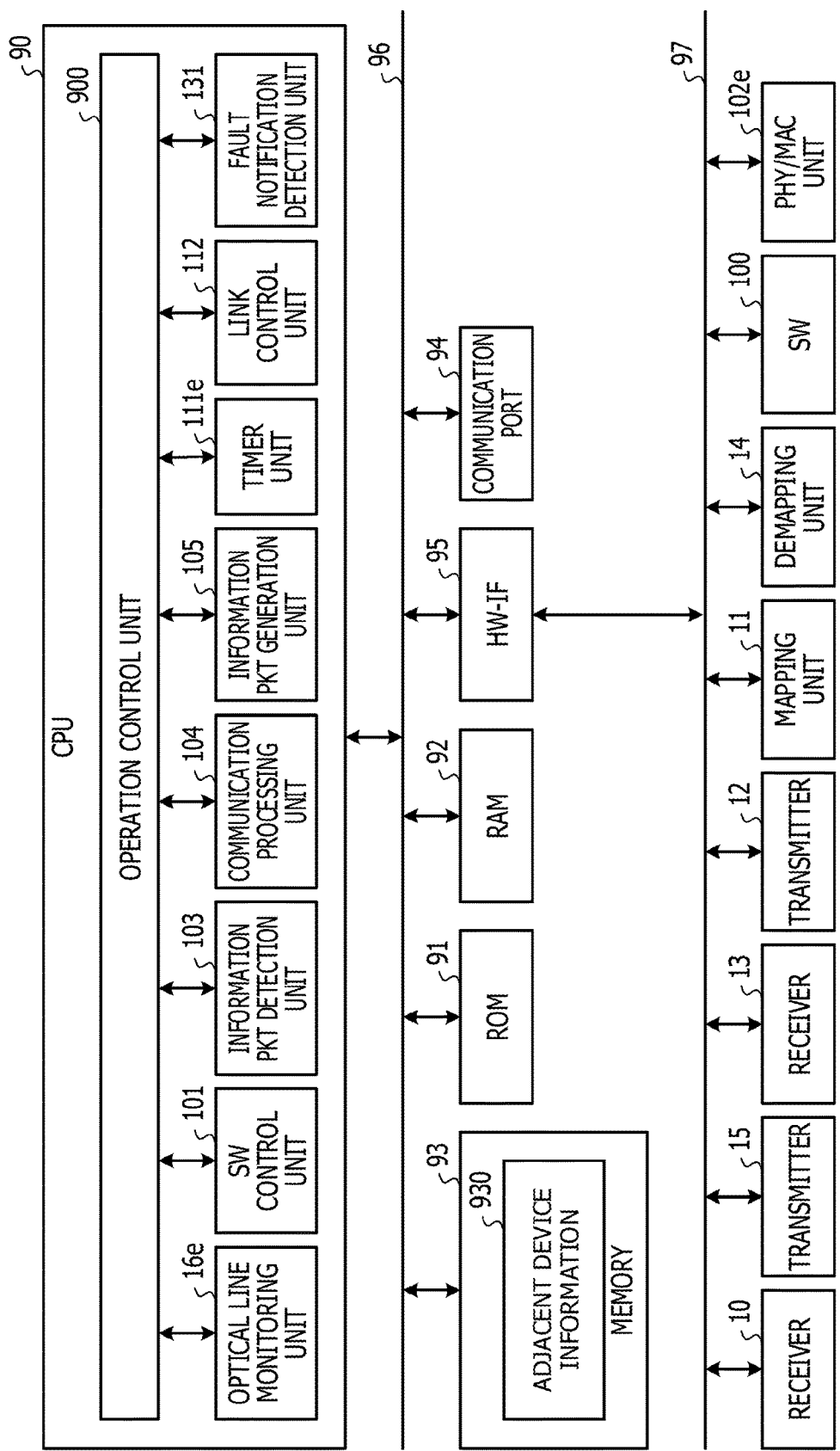
FIG. 16 is a configuration diagram illustrating a transponder according to a fourth embodiment.

FIG. 16 is a configuration diagram illustrating the transponders 1a, 1b according to the fourth embodiment. In FIG. 16, components common to those of FIG. 4 are assigned with same reference numerals, and description thereof is omitted.

The transponders 1a, 1b include the CPU 90, the ROM 91, the RAM 92, the memory 93, the communication port 94, the HW-IF 95, the receivers 10, 13, the transmitters 12, 15, the mapping unit 11, the demapping unit 14, the switch unit 100, and a PHY/MAC unit 102e. Upon reading the program from the ROM 91, the CPU 90 creates, as functions, the operation control unit 900, an optical line monitoring unit 16e, the switch control unit 101, an information packet detection unit 103, the communication processing unit 104, the information packet generation unit 105, a timer unit 111e, the link control unit 112, and a fault notification detection unit 131.

The operation control unit 900 causes the optical line monitoring unit 16e, the switch control unit 101, the information packet detection unit 103, the communication processing unit 104, the information packet generation unit 105, the timer unit 111e, the link control unit 112, and the fault notification detection unit 131 to operate in cooperation with the receivers 10, 13, transmitters 12, 15, the mapping unit 11, the demapping unit 14, the switch unit 100, and the PHY/MAC unit 102e by the HW-IF 95.

Figure 17:
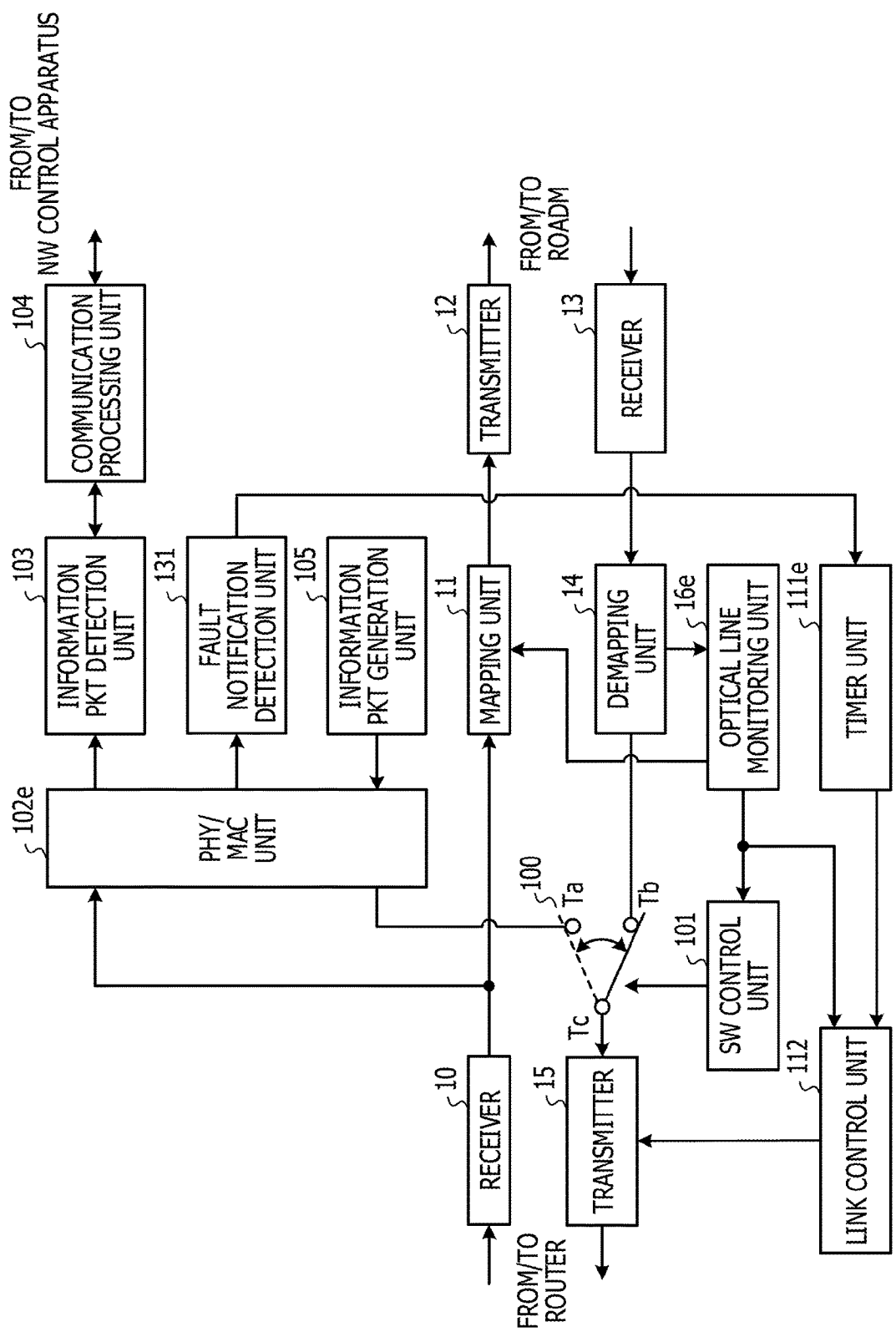
FIG. 17 illustrates a functional configuration of a transponder according to the fourth embodiment.

FIG. 17 illustrates a functional configuration of the transponders 1a, 1b according to the fourth embodiment. In FIG. 17, components common to those of FIG. 9 are assigned with same reference numerals, and description thereof is omitted.

In addition to the same function as the PHY/MAC unit 102, the PHY/MAC unit 102e includes a function to output the Ethernet signal inputted from the routers 2a, 2b via the receiver 10 to the fault notification detection unit 131. The fault notification detection unit 131 detects the "Remote Fault" notification (or notification of the communication disabled state) from the Ethernet signal inputted from the PHY/MAC unit 102e. Upon detecting the "Remote Fault" notification, the fault notification detection unit 131 outputs the instruction signal of timer-start to the timer unit 111e.

The optical line monitoring unit 16e is an example of the detection unit, and is configured to detect the communication disabled state with corresponding devices, the transponders 1a, 1b. More specifically, in the same manner as the optical line monitoring units 16, 16c, 16d of the above embodiments, the optical line monitoring unit 16e detects non-setting and fault of the optical line and detects setting and fault recovery of the optical line.

When detected non-setting or fault of the optical line, the optical line monitoring unit 16e outputs the instruction signal to the switch control unit 101 so as to change over the coupling destination of the terminal Tc of the switch unit 100 to the terminal Ta on the side of the PHY/MAC unit 102e. The switch control unit 101 changes over the coupling destination of the terminal Tc of the switch unit 100 to the terminal Ta on the side of the PHY/MAC unit 102 according to the instruction signal.

When fault or deletion of the optical line is detected, the link control unit 112 decouples the link with the routers 2a, 2b by controlling the transmitter 15 according to the instruction signal. More specifically, the link control unit 112 notifies the fault of the optical line to the routers 2a, 2b by the function of the link pass through.

The timer unit 111e causes the timer to start in response to input of the instruction signal from the fault notification detection unit 131 to count a time sufficient for changing the transfer path of the routers 2a, 2b. The timer unit 111e notifies expiration of the timer to the switch control unit 101d. The link control unit 112 re-couples the link with the routers 2a, 2b by controlling the transmitter 15 in response to the notification of the timer termination.

Thus, the timer unit 111e causes the timer to start in response to the "Remote Fault" notification from the routers 2a, 2b. The link control unit 112 decouples the link with the routers 2a, 2b in response to detection of fault or deletion of the optical line by the optical line monitoring unit 16e and re-couples the link in response to timer expiration notification from the timer unit 111e.

Figure 18:
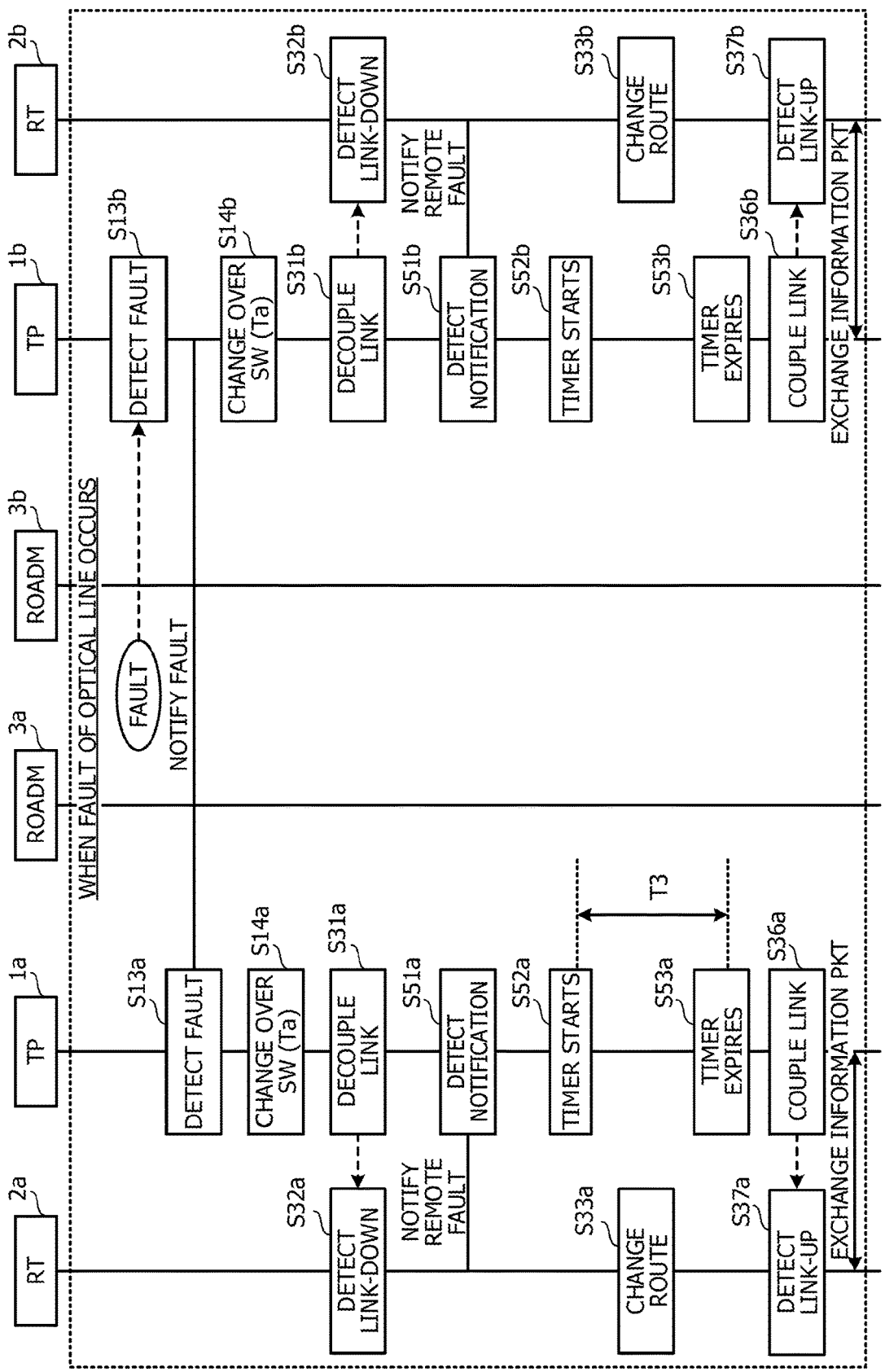
FIG. 18 is a sequence diagram illustrating operation (Part 1) of a communication system according to the fourth embodiment.
Figure 19:
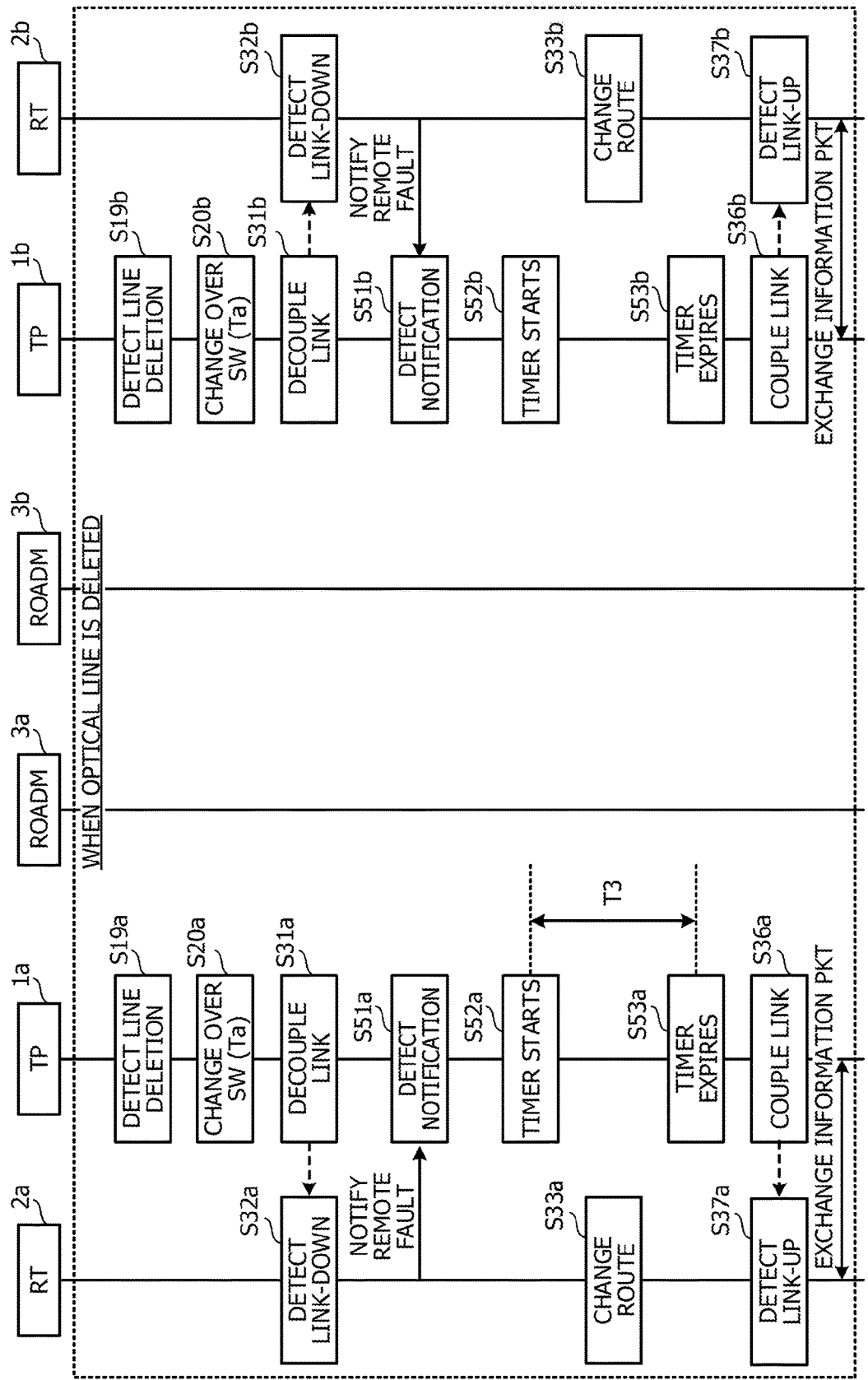
FIG. 19 is a sequence diagram illustrating operation (Part 2) of the communication system according to the fourth embodiment.

FIGS. 18 and 19 are sequence diagrams illustrating operation of the communication system according to the fourth embodiment. FIG. 18 illustrates operation when fault occurs in the optical line (see "when fault occurs in optical line"). In FIG. 18, components common to those of FIG. 10 are assigned with same reference numerals, and description thereof is omitted.

Operation when the optical line is not set is the same as the operation of the first embodiment. More specifically, when the optical line monitoring unit 16e detects non-setting of the optical line, the switch control unit 101 changes over the coupling destination of the terminal Tc of the switch unit 100 to the terminal Ta on the side of the PHY/MAC unit 102. This couples the PHY/MAC unit 102 to the transmitter 15, allowing the information packet generation unit 105 to transmit the information packet to the routers 2a, 2b via the transmitter 15.

Operation when the optical line is set is also the same as the operation of the first embodiment. More specifically, when the optical line monitoring unit 16e detects setting of the optical line, the switch control unit 101 changes over the coupling destination of the terminal Tc of the switch unit 100 to the terminal Tb on the side of the demapping unit 14. This couples the demapping unit 14 to the transmitter 15, thus allowing the transponders 1a, 1b to convert the optical signal received from the optical line into the Ethernet signal and transmit to the routers 2a, 2b.

Each of the routers 2a, 2b outputs the "Remote Fault" notification to the transponders 1a, 1b in response to detection of the link-down. Next, each of the routers 2a, 2b determines that the transfer path passing through the transponders 1a, 1b is not available due to detection of the link-down, and changes the transfer path of the user packet in accordance with the OSPF (reference signs S33a, S33b).

The fault notification detection units 131 of the transponders 1a, 1b detect the "Remote Fault" notification from the routers 2a, 2b (reference signs S51a, S51b). The timer unit 111e causes the timer to start in response to detection of the "Remote Fault" notification (reference signs S52a, S52b).

The timer unit 111e counts a predetermined time T3 with the timer. The predetermined time T3 is preset to a time sufficient for the processing of changing the transfer path of the routers 2a, 2b. Upon detecting the timer expiration (reference signs S53a, S53b), the timer unit 111e notifies to that effect to the link control unit 112.

In response to the notification of the timer expiration, the link control unit 112 couples the link with the routers 2a, 2b (reference signs S36a, S36b). This allows the transmitter 15 to transmit the Ethernet signal to the routers 2a, 2b. Thus, the information packet generation unit 105 may transmit the information packet to the routers 2a, 2b via the transmitter 15.

The routers 2a, 2b detect the link-up with the transponders 1a, 1b by receiving the Ethernet signal (for example, idle signal) from the transmitter 15 (reference signs S37a, S37b).

This allows the routers 2a, 2b and the transponders 1a, 1b to exchange the information packet with each other. Thus, the routers 2a, 2b and the transponders 1a, 1b may easily recognize mutual adjacency relationship even when a fault occurs in the optical line. Thus, the transponders 1a, 1b may monitor the coupling state with the routers 2a, 2b when a fault occurs.

FIG. 19 illustrates operation when the optical line is deleted (see "when optical line is deleted"). In FIG. 19, components common to those of FIGS. 11 and 18 are assigned with same reference numerals, and description thereof is omitted.

Operation when the fault of the optical line is recovered is the same as the operation of the first embodiment. More specifically, when the optical line monitoring unit 16e detects fault recovery of the optical line, the switch control unit 101 changes over the coupling destination of the terminal Tc of the switch unit 100 to the terminal Tb on the side of the demapping unit 14. This couples the demapping unit 14 to the transmitter 15, thus allowing the transponders 1a, 1b to convert the optical signal received from the optical line into the Ethernet signal and transmit to the routers 2a, 2b.

Upon detecting deletion of the optical line (reference signs S19a, S19b), the optical line monitoring unit 16e of the transponders 1a, 1b outputs the instruction signal to the switch control unit 101 to change over the coupling destination of the terminal Tc of the switch unit 100 to the terminal Ta on the side of the PHY/MAC unit 102e (reference signs S20a, S20b). Thereafter, operations illustrated in reference signs S31a to S33a, S36a, S37a, S51a to S53a, S31b to S33b, S36b, S37b, and S51b to S53b are executed.

Thus, the routers 2a, 2b and the transponders 1a, 1b may easily recognize mutual adjacency relationship even when the optical line is deleted. Thus, the transponders 1a, 1b may monitor the coupling state with the routers 2a, 2b even after the optical line is deleted.

In the fourth embodiment, the information packet generation unit 105 transmits the information packet after elapse of a predetermined time T3 since detection of the communication disabled state with corresponding devices, the transponders 1a, 1b. Thus, the transponders 1a, 1b may recognize the adjacency relationship after the transfer path of the routers 2a, 2b has been changed.

In the fourth embodiment, when the communication disabled state with corresponding devices, the transponders 1a, 1b is detected by the optical line monitoring unit 16e, the link control unit 112 causes the transmitter 15 to stop transmission of the Ethernet signal. In response to the stop, the link control unit 112 causes the transmitter 15 to resume transmission of the Ethernet signal after elapse of a predetermined time T3 since the communication disabled state is notified by the routers 2a, 2b in the client networks NWa, NWb.

Thus, when fault or deletion of the optical line is detected, the transponders 1a, 1b and the routers 2a, 2b may recognize mutual adjacency relationship by exchanging the information packet after the transfer path of the routers 2a, 2b is changed. The timer unit 111e causes the timer to start when the "Remote Fault" notification is received from the routers 2a, 2b. Thus, timer expiration time may be easily estimated without considering the transmission delay between the transponders 1a, 1b and the routers 2a, 2b.

As described above, the transponders 1a, 1b may exchange the information packet with the routers 2a, 2b irrespective of availability of communication with corresponding devices, transponders 1b, 1a by the optical line. The transponders 1a, 1b acquire the adjacent device information 930 by exchanging the information packet and retain in the memory 93.

In response to a request from the WDM network control apparatus 4, the communication processing unit 104 transmits the adjacent device information 930 from the communication port 94 to the WDM network control apparatus 4. This allows the WDM network control apparatus 4 to use the adjacent device information 930 for monitoring and control of the WDM network NWc. The following describes the WDM network control apparatus 4.

(WDM Network Control Apparatus)

Figure 20:
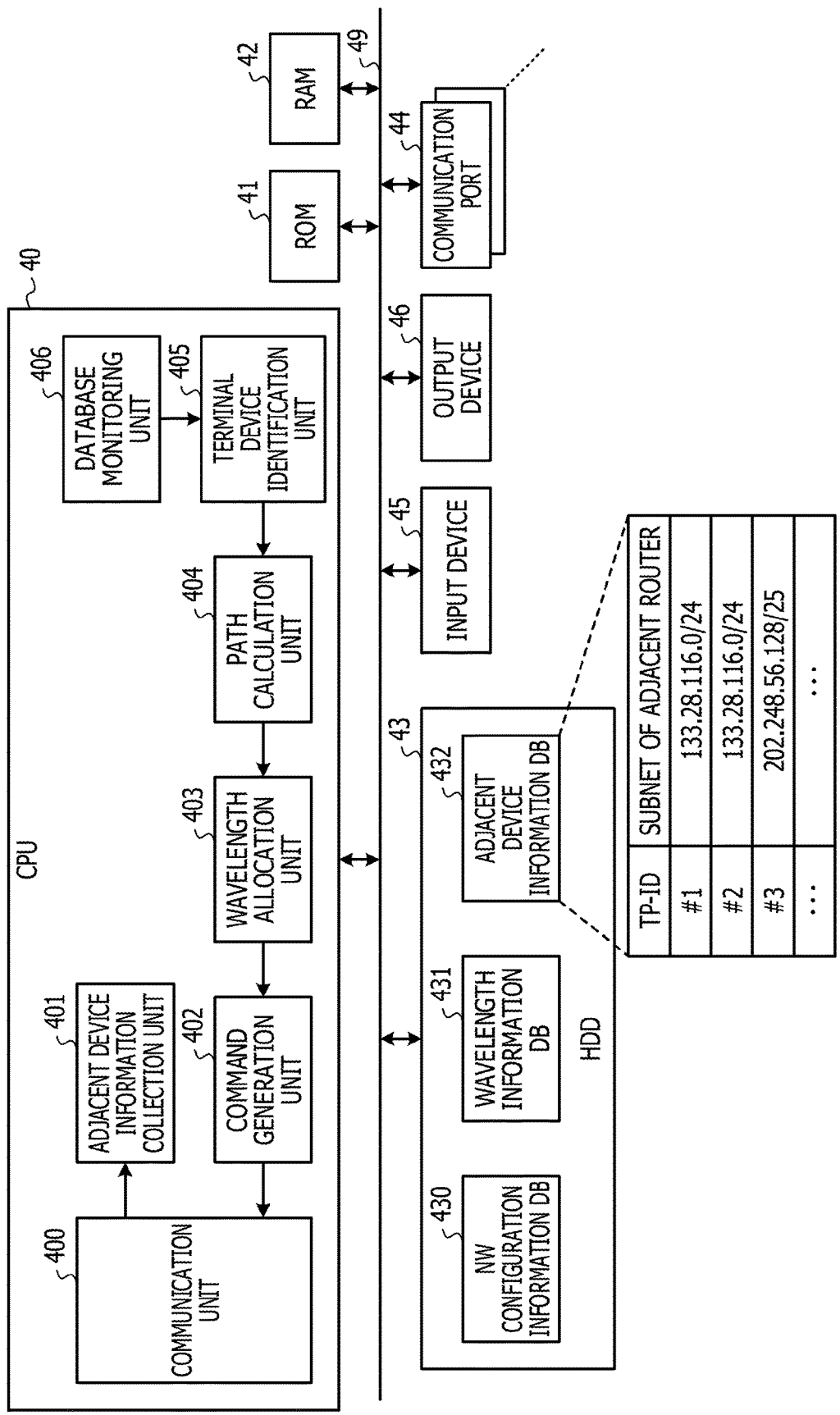
FIG. 20 is a configuration diagram illustrating an example of a WDM network control apparatus.

FIG. 20 is a configuration diagram illustrating an example of the WDM network control apparatus 4. The WDM network control apparatus 4 is, for example, a server apparatus, including a CPU 40, a ROM 41, a RAM 42, an HDD 43, the plurality of communication ports 44, an input device 45, and an output device 46. The CPU 40 is coupled with the ROM 41, the RAM 42, the HDD 43, the plurality of communication ports 44, the input device 45, and the output device 46 via a bus 49 so as to allow mutual input and output of signals. The WDM network control apparatus 4 may include another processor including the microprocessor instead of the CPU 40.

The ROM 41 stores a program which drives the CPU 40. The RAM 42 functions as a working memory of the CPU 40. The plurality of communication ports 44 is, for example, a local area network (LAN) card and a network interface card (NIC), processing communication with the ROADMs 3a, 3b and the transponders 1a, 1b in the WDM network NWc.

The input device 45 is a device configured to input information into the WDM network control apparatus 4. The input device 45 includes, for example, a keyboard, a mouse, and a touch panel. The input device 45 outputs the inputted information to the CPU 40 via the bus 49.

The output device 46 is a device configured to output information of the WDM network control apparatus 4. The output device 46 includes, for example, a display, a touch panel, and a printer. The output device 46 acquires information from the CPU 40 via the bus 49 and outputs.

Upon reading a program from the ROM 41, the CPU 40 creates, as functions, a communication processing unit 400, an adjacent device information collection unit 401, a command generation unit 402, a wavelength allocation unit 403, a path calculation unit 404, a terminal device identification unit 405, and a database monitoring unit 406. The HDD 43 stores a network (NW), a configuration information database (DB) 430, a wavelength information database (DB) 431, and an adjacent device information database (DB) 432. Functions created in the CPU 40 by the program may be constituted as logical circuits, for example, by the FPGA. This also applies to other embodiments.

The communication processing unit 400 includes, for example, a client function of the NETCONF, processing a communication via the plurality of communication ports 44. The adjacent device information collection unit 401 collects the adjacent device information 930 from each of the transponders 1a, 1b via the communication processing unit 400. The adjacent device information collection unit 401 registers the adjacent device information 930 collected from each of the transponders 1a, 1b into the adjacent device information DB 432 of the HDD 43. The adjacent device information DB 432 registers transponder IDs (TP-ID) (#1 to #3) of the adjacent device information 930 and subnets of adjacent routers. In this embodiment, the information packet is assumed to be a hello packet of the OSPF. In this embodiment, TP-ID of the transponder 1a is #1, and the TP-ID of the transponder 1b is #2.

The database monitoring unit 406 monitors the adjacent device information DB 432. The database monitoring unit 406 determines whether new adjacent device information 930 is added to the adjacent device information DB 432. When the adjacent device information 930 is added, the database monitoring unit 406 recognizes that new routers 2a, 2b are coupled to the WDM network NWc, and instructs the terminal device identification unit 405 to start a specific processing of the transponders 1a, 1b at both ends of the new optical line.

The terminal device identification unit 405 refers to the adjacent device information DB 432 and thereby identifies the transponders 1a, 1b at both ends of the new optical line. More specifically, the terminal device identification unit 405 searches the TP-ID of the adjacent device information 930 including the subnet of the adjacent router common to the added new adjacent device information 930 from the adjacent device information DB 432. For example, when the adjacent device information 930 with the TP-ID of #2 is added to the adjacent device information DB 432, the terminal device identification unit 405 searches the subnet with the TP-ID=#1 common to the adjacent device information 930.

Thus, the terminal device identification unit 405 identifies, for example, the transponder 1a with the TP-ID=#1 and the transponder 1b with the TP-ID=#2 as devices at both ends of the optical line. The terminal device identification unit 405 notifies the identified transponders 1a, 1b at both ends to the path calculation unit 404.

The path calculation unit 404 refers to the NW configuration information DB 430 and thereby calculates the path of the optical line having, at both ends thereof, the transponders 1a, 1b identified by the terminal device identification unit 405. The NW configuration information DB 430 pre-registers information indicating the configuration of the WDM network NWc. The path calculation unit 404 outputs information of the calculated path to the wavelength allocation unit 403.

The wavelength allocation unit 403 allocates a wavelength searched from the wavelength information DB 431 to the path of the optical line calculated by the path calculation unit 404. The wavelength information DB 431 registers the allocation state to the optical line for every wavelength. The wavelength allocation unit 403 allocates a non-allocated wavelength to a new optical line. The wavelength allocation unit 403 outputs information of the allocated wavelength and information of the path to the command generation unit 402.

The command generation unit 402 generates optical line setting commands for the transponders 1a, 1b and the ROADMs 3a, 3b from information of the wavelength and path, and transmits from the communication processing unit 400 to the transponders 1a, 1b and the ROADMs 3a, 3b via the communication port 44.

Thus, the WDM network control apparatus 4, which collects the adjacent device information 930 from the transponders 1a, 1b, easily sets up the optical line for the WDM network NWc. The WDM network control apparatus 4 may set the optical line in cooperation with the client network control apparatus 5.

Figure 21:
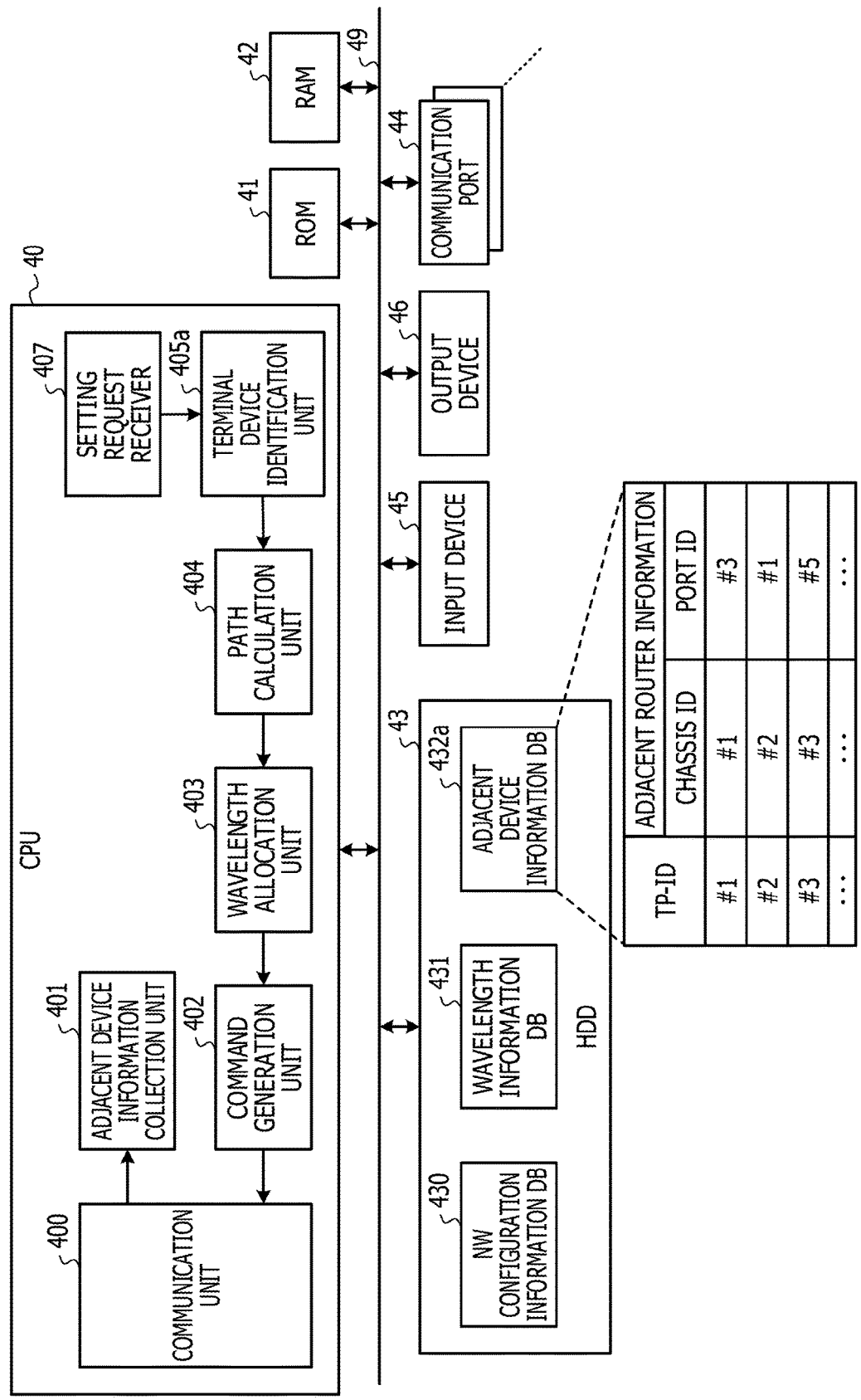
FIG. 21 is a configuration diagram illustrating another example of the WDM network control apparatus.

FIG. 21 is a configuration diagram illustrating another example of the WDM network control apparatus 4. In FIG.

21, components common to those of FIG. 20 are assigned with same reference numerals, and description thereof is omitted.

Upon reading a program from the ROM 41, the CPU 40 creates, as functions, the communication processing unit 400, the adjacent device information collection unit 401, the command generation unit 402, the wavelength allocation unit 403, the path calculation unit 404, a terminal device identification unit 405a, and a setting request receiver 407. The HDD 43 stores the NW configuration information DB 430, the wavelength information DB 431, and an adjacent device information DB 432a.

In this embodiment, the information packet is assumed to be a link layer discovery protocol (LLDP) packet. For this reason, the adjacent device information 930 includes a chassis ID and a port ID of the routers 2a, 2b as adjacent router information. The chassis ID is the identification number of the chassis (casing) of the routers 2a, 2b, and the port ID is the identification number of the port of the routers 2a, 2b. The adjacent device information DB 432a registers the TP-ID, the chassis ID, and the port ID.

The setting request receiver 407 receives an optical line setting request from the client network control apparatus 5. The setting request specifies the chassis ID and the port ID of the routers 2a, 2b to be coupled by the optical line. The setting request receiver 407 outputs the chassis ID and the port ID to the terminal device identification unit 405a.

The terminal device identification unit 405a identifies, based on the chassis ID and the port ID specified by the optical line setting request, the transponders 1a, 1b at both ends of the optical line coupling the routers 2a, 2b with each other from the adjacent device information DB 432a. For example, when the optical line setting request specifies the port #3 of the router 2a and the port #1 of the router 2b, the terminal device identification unit 405a identifies the transponder 1a of TP-ID=#1 and the transponder 1b of TP-ID=#2 from the adjacent device information DB 432a. The terminal device identification unit 405 notifies the identified transponders 1a, 1b to the path calculation unit 404. Thereafter, the optical line is set by the above operation.

Thus, without recognizing the configuration of the WDM network NWc, the client network control apparatus 5 may couple the routers 2a, 2b with each other by using the optical line in cooperation with the WDM network control apparatus 4.

Fifth Embodiment

In the above embodiments, the transponders 1a, 1b are provided in the WDM network NWc coupled with the WDM network control apparatus 4. However, the transponders 1a, 1b may be provided in a WDM network NWc in which the WDM network control apparatus 4 is not provided.

Figure 22:
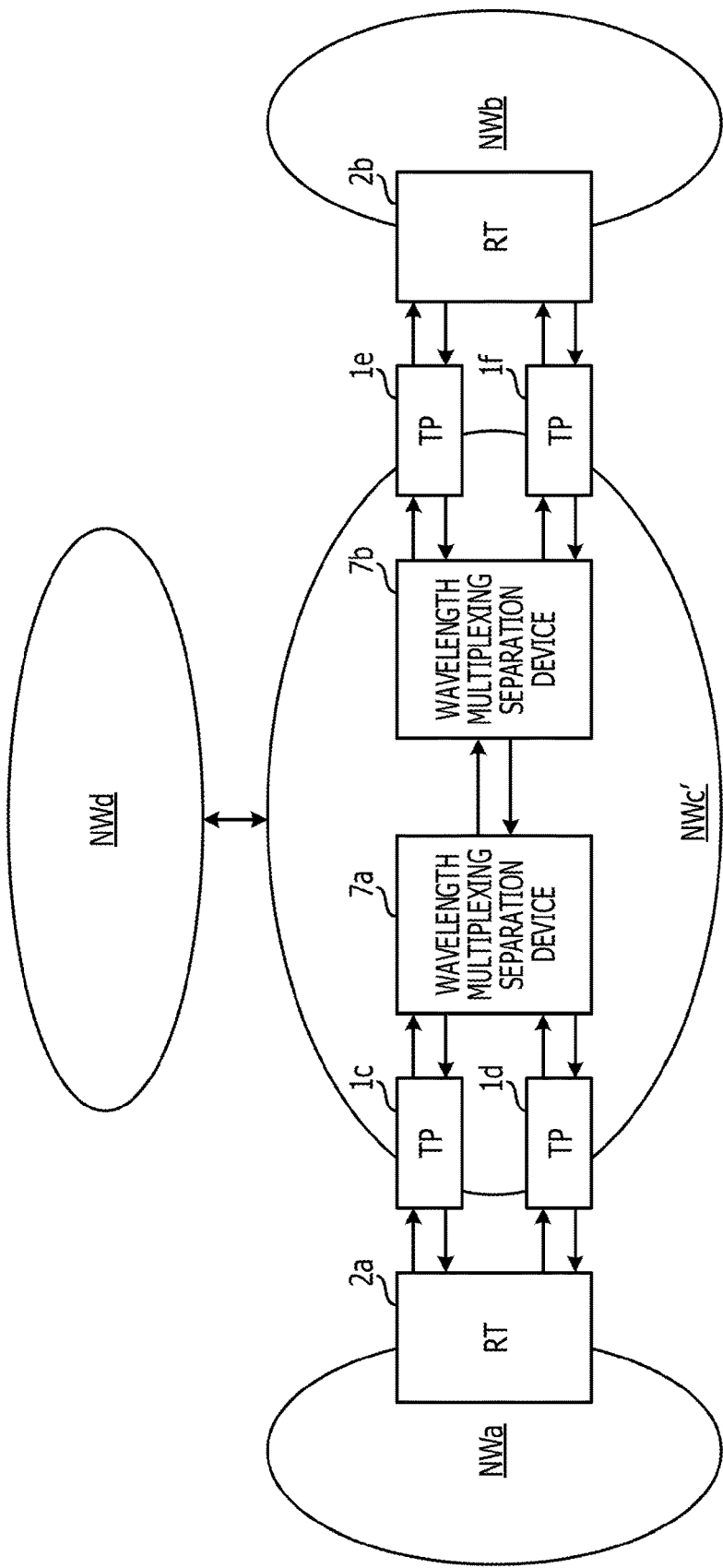
FIG. 22 is a configuration diagram illustrating another example of a communication system.

FIG. 22 is a configuration diagram illustrating another example of the communication system. The communication system includes transponders (TP) 1c to 1d which are an example of the communication apparatus, routers (RT) 2a, 2b in the client networks NWa, NWb, and wavelength multiplexing separation devices 7a, 7b.

The router 2a is coupled with two transponders 1c, 1d via separate ports, and the router 2b is coupled with two transponders 1e, 1f via separate ports. The router 2a and transponders 1c, 1d, and the router 2b and transponders 1e, 1f may be coupled with each other by using a metal cable instead of an optical fiber. Each of the routers 2a, 2b communicates through the optical line in the WDM network NWc.

The transponders 1c to 1d and wavelength multiplexing separation devices 7a, 7b are provided in the WDM network NWc. The transponders 1c, 1d and the wavelength multiplexing separation device 7a, and the transponders 1e, 1f and the wavelength multiplexing separation device 7b are coupled with each other by using a pair of optical fibers. The wavelength multiplexing separation devices 7a, 7b are coupled with each other by using a pair of optical fibers.

Unlike the ROADMs 3a, 3b, the wavelength multiplexing separation devices 7a, 7b do not include the optical signal switching function for every wavelength by the wavelength selection switch, and provide an optical line of the point-to-point scheme. The wavelength multiplexing separation device 7a receives optical signals of different wavelengths from the transponders 1c, 1d, and wavelength-multiplex the optical signals to transmit to another wavelength multiplexing separation device 7b as a wavelength multiplexing optical signal.

The wavelength multiplexing separation device 7b receives the wavelength multiplexing optical signals from the wavelength multiplexing separation device 7a and separates the optical signals for every wavelength. For example, when the transponder 1c and the transponder 1e have a corresponding relation therebetween and the transponder 1d and the transponder 1f have a corresponding relation therebetween, the wavelength multiplexing separation device 7b transmits the optical signal of the transponder 1c to the transponder 1e, and transmits the optical signal of the transponder 1d to the transponder 1f. In the same manner, the wavelength multiplexing separation devices 7a, 7b perform transmission processing in a transmission direction from the wavelength multiplexing separation device 7a toward the wavelength multiplexing separation device 7b based on the corresponding relation the between the transponders 1c, 1d.

Each of the transponders 1c to 1f exchanges the adjacent device information 930 with each other via the control network NWd and thereby identifies corresponding devices from the transponders 1c to 1f in the WDM network NWc and execute negotiation with corresponding devices, the transponders 1c to 1f for the communication condition. Thus, the transponders 1c to 1f may set the optical line even when the WDM network control apparatus 4 is not provided. The following describes the configuration of the transponders 1c to 1f.

Figure 23:
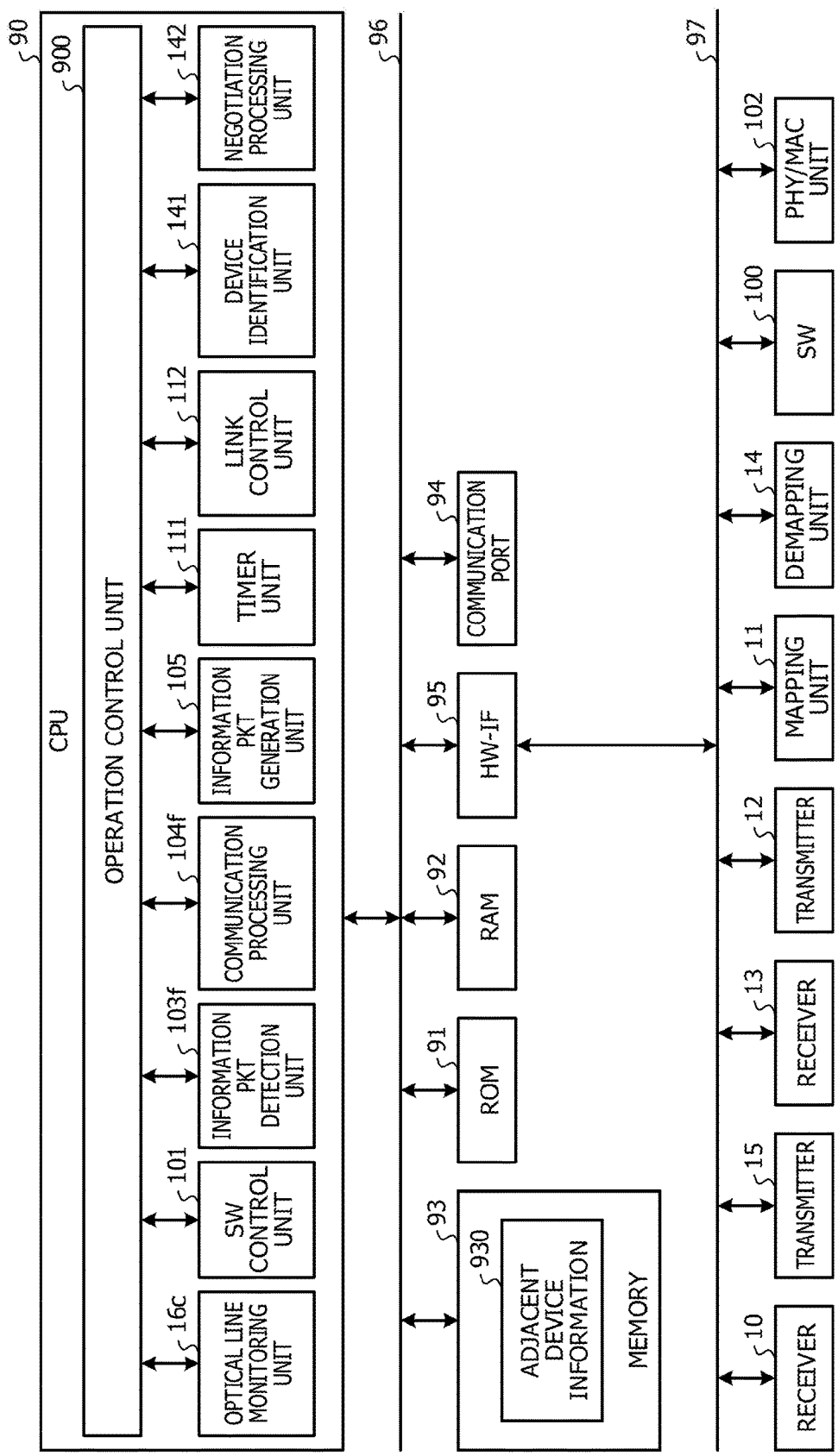
FIG. 23 is a configuration diagram illustrating a transponder according to a fifth embodiment.

FIG. 23 is a configuration diagram illustrating the transponders 1c to 1f according to the fifth embodiment. In FIG. 23, components common to those of FIG. 8 are assigned with same reference numerals, and description thereof is omitted. In the fifth embodiment, the communication port 94 communicates with other the transponders 1c to 1f via the control network NWd.

Upon reading the program from the ROM 91, the CPU 90 creates, as functions, the operation control unit 900, the optical line monitoring unit 16c, the switch control unit 101, an information packet detection unit 103f, a communication processing unit 104f, the information packet generation unit 105, the timer unit 111, the link control unit 112, a device identification unit 141, and a negotiation processing unit 142. The fifth embodiment includes the configuration of the transponders 1a, 1b of the second embodiment plus the device identification unit 141 and the negotiation processing unit 142. However, the fifth embodiment may include the configuration of the first embodiment, the third embodiment or the fourth embodiment plus the device identification unit 141 and the negotiation processing unit 142.

The operation control unit 900 causes the optical line monitoring unit 16c, the switch control unit 101, the information packet detection unit 103f, the communication processing unit 104f, the information packet generation unit 105, the timer unit 111, the link control unit 112, the device identification unit 141, and the negotiation processing unit 142 to operate in cooperation with the receivers 10, 13, transmitters 12, 15, the mapping unit 11, the demapping unit 14, the switch unit 100, and the PHY/MAC unit 102 by the HW-IF 95.

Figure 24:
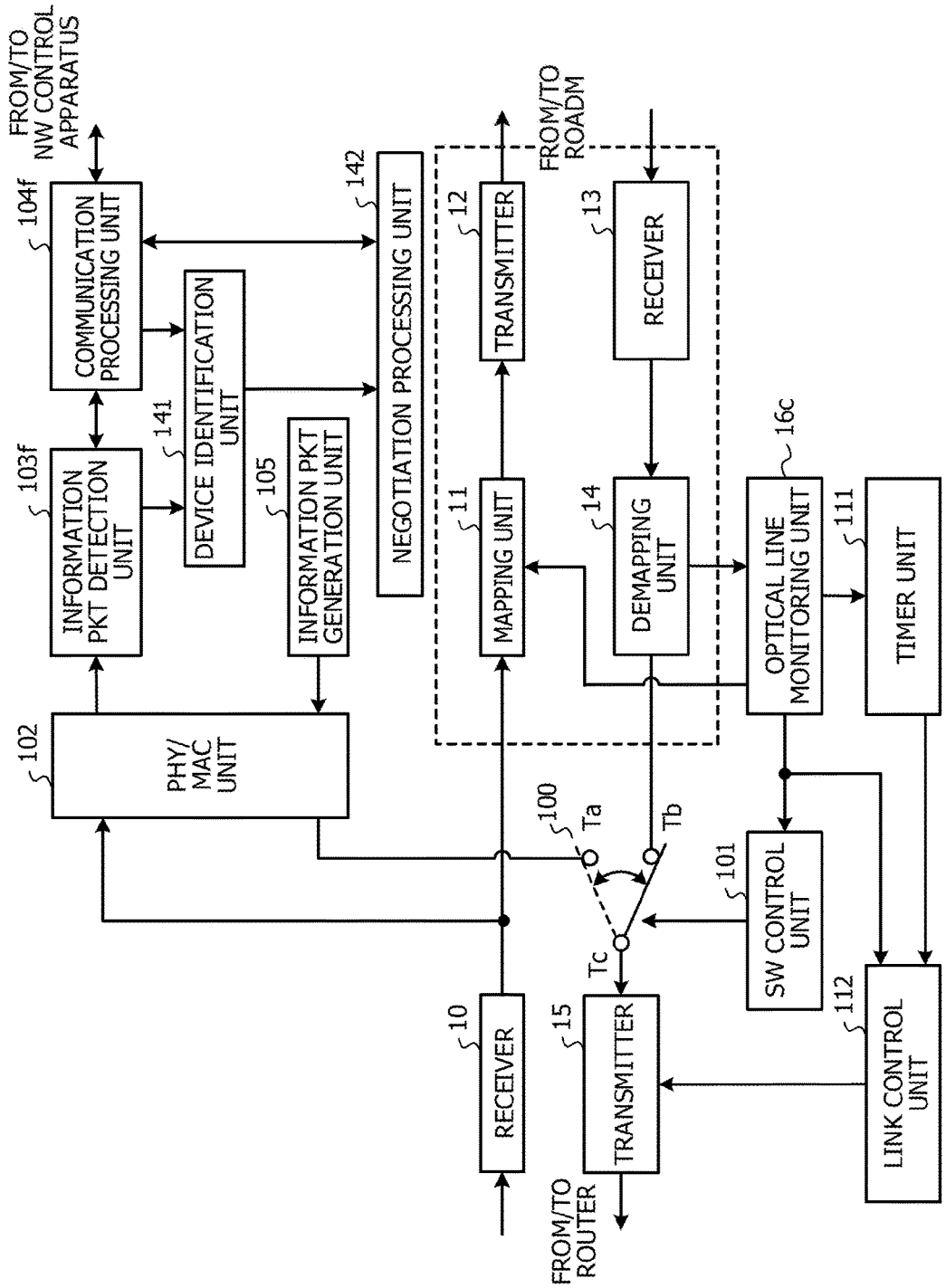
FIG. 24 illustrates functional configuration of a transponder according to the fifth embodiment.

FIG. 24 illustrates a functional configuration of the transponders is to 1f according to the fifth embodiment. In FIG. 24, components common to those of FIG. 9 are assigned with same reference numerals, and description thereof is omitted. The communication processing unit 104f controls the communication port 94 and thereby communicates with the other transponders 1c to 1f via the control network NWd.

The information packet detection unit 103f detects the information packet from the Ethernet signal inputted from the PHY/MAC unit 102. The information packet detection unit 103f acquires the adjacent device information 930 from the information packet and outputs to the memory 93 and the communication processing unit 104f. The information packet detection unit 103f notifies detection of the information packet to the device identification unit 141. In the fifth embodiment, the information packet is assumed to be a hello packet of the OSPF.

The communication processing unit 104f exchanges the adjacent device information 930 with the transponders 1c to 1f which are candidates of corresponding devices. For example, the communication processing unit 104f of the transponder 1c transmits the adjacent device information 930 to the transponders 1e, 1f and receives the adjacent device information 930 from the transponders 1e, 1f. The communication processing unit 104f outputs the adjacent device information 930 to the device identification unit 141.

Upon receiving the notification of the detection of the information packet, the device identification unit 141 identifies the transponders 1c to 1f of the corresponding devices based on the adjacent device information 930 inputted from the communication processing unit 104f and the adjacent device information 930 in the memory 93. More specifically, the device identification unit 141 detects, among the adjacent device information 930 inputted from the communication processing unit 104f, the adjacent device information 930 having a subnet common to the adjacent device information 930 in the memory 93, and identifies the transponders 1c to 1f which is the transmission source of the adjacent device information 930 as corresponding devices.

The device identification unit 141 of the transponder 1c recognizes from the adjacent device information 930 in the memory 93 that the subnet of the coupling port of the router 2a is [133.28.116.0/24]. Also, the device identification unit 141 of the transponder 1c, for example, recognizes from the adjacent device information 930 inputted from the communication processing unit 104f that the subnet of the coupling port of the router 2b of the transponder 1e is [133.28.116.0/24]. In this case, subnets of coupling ports of the routers 2a, 2b are common to each other. Thus, the device identification unit 141 identifies the transponder 1c as the corresponding device. The device identification unit 141 notifies the transponders 1a, 1b identified as corresponding devices to the negotiation processing unit 142.

The negotiation processing unit 142 executes negotiation with corresponding devices, the transponders 1c to 1f identified by the device identification unit 141 for the communication condition. More specifically, the negotiation processing unit 142 communicates with corresponding devices, the transponders 1c to 1f via the communication processing unit 104f for the communication condition including, for example, the wavelength of optical line and the forward error correction (FEC) scheme. The negotiation processing unit 142 sets the transmitter 12, the receiver 13, the demapping unit 14, and the mapping unit 11 based on the communication condition determined with corresponding devices, transponders 1c to 1f.

Thus, the transponders 1c to 1f identify corresponding devices, the transponders 1c to 1f by the device identification unit 141, and execute negotiation with the transponders 1c to 1f for the communication condition. Thus, the transponders 1c to 1f may set the optical line even without the WDM network control apparatus 4.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus configured to communicate with a router included in a first network and a multiplexer that multiplexes a plurality of optical signals having different wavelengths transmitted from the communication apparatus, the communication apparatus comprising:
   a memory; and
   a processor coupled to the memory and configured to:
      transmit and receive a first signal to and from the router,
      transmit and receive a second signal to and from another communication apparatus in a second network through the multiplexer, the second signal having a transmission scheme different from the first signal,
      mutually convert the first signal and the second signal with each other,
      detect a first communication disabled state between the another communication apparatus and the communication apparatus, and
      transmit, to the router, a first detection signal for detecting adjacency relationship between the communication apparatus and the router when the first communication disabled state is detected.

2. The communication apparatus according to claim 1, wherein
   the processor is configured to transmit the first detection signal to the router after elapse of a first time from detection of the first communication.

3. The communication apparatus according to claim 2, wherein the processor is configured to:
   stop transmission of the first signal when the first communication disabled state is detected, and
   resume transmission of the first signal after elapse of the first time.disabled state.

4. The communication apparatus according to claim 1, wherein
   the router is configured to detect communication enabled state between the router and the communication apparatus based on the first detection signal.

5. The communication apparatus according to claim 1, wherein the processor is configured to transmit a first notification signal indicating the first communication disabled state to the router when the first communication disabled state is detected.

6. The communication apparatus according to claim 1, wherein the processor is configured to:
stop transmission of the first signal when the first communication disabled state between the another communication apparatus and the communication apparatus is detected, and
resume transmission of the first signal after elapse of a second time from reception of a second notification signal from the router indicating a second communication disabled state between the router and the communication apparatus.

7. The communication apparatus according to claim 1, wherein the processor is configured to transmit information indicating the communication enabled state between the router and the communication apparatus to a control apparatus configured to control the second network.

8. The communication apparatus according to claim 7, wherein the processor is configured to:
identify the another communication apparatus from a plurality of communication apparatuses in the second network based on the information indicating the communication enabled state, and
execute negotiation with the identified another communication apparatus for communication condition.

9. The communication apparatus according to claim 1, wherein
the first signal is an Ethernet signal, and
the second signal is an optical signal having a scheme different from the Ethernet signal.

10. The communication apparatus according to claim 9, wherein
the multiplexer is a reconfigurable optical add and drop multiplexer (ROADM) configured to wavelength-multiplex and transmit a plurality of optical signals having wavelengths different from each other, and
the communication apparatus is a transponder configured to transmit and receive the plurality of optical signals to and from the ROADM.

11. The communication apparatus according to claim 10, wherein
the first network is a local area network, and
the second network is a wavelength division multiplexing network.

12. A method of communication using a communication apparatus coupled to a router included in a first network and a multiplexer that multiplexes a plurality of optical signals having different wavelengths transmitted from the communication apparatus, the method comprising:
transmitting and receiving a first signal to and from the router;
transmitting and receiving a second signal to and from another communication apparatus in a second network through the multiplexer, the second signal having a transmission scheme different from the first signal;
mutually converting the first signal and the second signal with each other;
detecting a first communication disabled state between the another communication apparatus and the communication apparatus; and
transmitting, to the router, a first detection signal for detecting adjacency relationship between the communication apparatus and the router when the first communication disabled state is detected.

13. The method according to claim 12, wherein
the transmitting of the first detection signal is to the router is executed after elapse of a first time from detection of the first communication disabled state.

14. The method according to claim 13, further comprising:
stopping transmission of the first signal when the first communication disabled state is detected; and
resuming transmission of the first signal after elapse of the first time. state.

15. The method according to claim 12, wherein
the router detects communication enabled state between the router and the communication apparatus based on the first detection signal.

16. The method according to claim 12, further comprising:
transmitting a first notification signal indicating the first communication disabled state to the router when the first communication disabled state is detected.

17. The method according to claim 12, further comprising:
stopping transmission of the first signal when the first communication disabled state between the another communication apparatus and the communication apparatus is detected; and
resuming transmission of the first signal after elapse of a second time from reception of a second notification signal from the router indicating a second communication disabled state between the router and the communication apparatus.

18. The method according to claim 12, further comprising:
transmitting information indicating the communication enabled state between the router and the communication apparatus to a control apparatus configured to control the second network.

19. The method according to claim 18, further comprising:
identifying the another communication apparatus from a plurality of communication apparatuses in the second network based on the information indicating the communication enabled state; and
executing negotiation with the identified another communication apparatus for communication condition.

20. A communication system comprising:
a router included in a first network;
a communication apparatus coupled to the router; and
a multiplexer coupled to the communication apparatus and multiplexes a plurality of optical signals having different wavelengths transmitted from the communication apparatus, wherein the communication apparatus further comprises:
a memory; and
a processor coupled to the memory and configured to:
transmit and receive a first signal to and from the router,
transmit and receive a second signal to and from another communication apparatus in a second network through the multiplexer, the second signal having a transmission scheme different from the first signal,
mutually convert the first signal and the second signal with each other, detect a first communication disabled state between the another communication apparatus and the communication apparatus, and transmit, to the router, a first detection signal for detecting adjacency relationship between the communication apparatus and the router when the first communication disabled state is detected.

\* \* \* \* \*